(12) United States Patent
Hoshino et al.

(10) Patent No.: US 7,050,137 B2
(45) Date of Patent: May 23, 2006

(54) SUBSTRATE FOR USE IN A LIQUID CRYSTAL DISPLAY AND LIQUID CRYSTAL DISPLAY USING THE SAME

(75) Inventors: Atuyuki Hoshino, Kawasaki (JP); Shiro Hirota, Kawasaki (JP); Naoto Kondo, Kawasaki (JP); Tetsuya Fujikawa, Kawasaki (JP); Masahiro Kihara, Kawasaki (JP); Katsunori Misaki, Kawasaki (JP); Seiji Doi, Kawasaki (JP); Tomoshige Oda, Kawasaki (JP); Akira Komorita, Kawasaki (JP); Akihiro Matsui, Kawasaki (JP); Manabu Sawasaki, Kawasaki (JP); Masahiro Ikeda, Kawasaki (JP); Takashi Takagi, Kawasaki (JP); Tomonori Tanose, Kawasaki (JP); Takuya Saguchi, Kawasaki (JP); Hidetoshi Sukenori, Kawasaki (JP); Hiroyasu Inoue, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 152 days.

(21) Appl. No.: 10/259,977

(22) Filed: Sep. 27, 2002

(65) Prior Publication Data
US 2003/0063249 A1    Apr. 3, 2003

(30) Foreign Application Priority Data
Sep. 28, 2001  (JP) ............................... 2001-299894
Apr. 23, 2002  (JP) ............................... 2002-120489

(51) Int. Cl.
*G02F 1/1345*  (2006.01)

(52) U.S. Cl. ........................... 349/149; 349/59; 349/72

(58) Field of Classification Search ................ 349/149, 349/59, 72; 257/59, 72
See application file for complete search history.

(56) References Cited

U.S. PATENT DOCUMENTS 5,831,700 A * 11/1998 Li et al. ........................ 349/88
6,636,288 B1 * 10/2003 Kim et al. .................. 349/139

FOREIGN PATENT DOCUMENTS

| JP | 54-092022 | 7/1979 |
| JP | 56-140324 | 11/1981 |
| JP | 64-068726 | 3/1989 |
| JP | 4-278902 | 10/1992 |
| JP | 6-202153 | 7/1994 |

(Continued)

*Primary Examiner*—Robert H. Kim
*Assistant Examiner*—George Y. Wang
(74) *Attorney, Agent, or Firm*—Greer, Burns & Crain, Ltd.

(57) ABSTRACT

The invention relates to a substrate for use in a liquid crystal display of a CF-on-TFT structure in which a color filter is formed on the side of an array substrate in which a switching element is formed, and has an object to provide a substrate for use in a liquid crystal display, which enables simplification of a manufacturing process typified by a photolithography process and has high reliability. The substrate for use in the liquid crystal display is constructed to include external connection terminals which include first terminal electrodes electrically connected to gate bus lines led out from a plurality of pixel regions arranged on a glass substrate in a matrix form, second terminal electrodes formed of forming material of a pixel electrode and directly on the glass substrate, and electrode coupling regions for electrically connecting the first and the second terminal electrodes, and which electrically connect an external circuit and the gate bus lines.

4 Claims, 31 Drawing Sheets

FOREIGN PATENT DOCUMENTS

| | | |
|---|---|---|
| JP | 10-186403 | 7/1998 |
| JP | 10-206888 | 8/1998 |
| JP | 11-024108 | 1/1999 |
| JP | 2000-098422 | 4/2000 |
| JP | 2000-187223 | 7/2000 |
| JP | 2000-231098 | 8/2000 |
| JP | 2000-231123 | 8/2000 |
| JP | 2000-338525 | 12/2000 |

\* cited by examiner

SUBSTRATE FOR USE IN A LIQUID CRYSTAL DISPLAY AND LIQUID CRYSTAL DISPLAY USING THE SAME

BACKGROUND OF THE INVENTION

1. Field of the Invention

The present invention relates to a substrate for use in a liquid crystal display, a method of manufacturing the same, and a liquid crystal display using the same, and particularly to a substrate for use in a liquid crystal display, which is used for an active matrix type liquid crystal display using a switching element of a thin film transistor (TFT) or the like, and a method of manufacturing the same. Further, the invention relates to a substrate for use in a liquid crystal display of a CF-on-TFT structure in which a color filter (CF) is formed on the side of an array substrate on which a switching element is formed, a method of manufacturing the same, and a liquid crystal display using the same.

2. Description of the Related Art

An active matrix type liquid crystal display (LCD) using a TFT as a switching element is disclosed in, for example, Japanese Patent Laid-Open No. 202153/1994. The publication discloses, as outlined below, a reversed stagger type TFT-LCD in which a channel protection film is formed.

A passivation film made of an inorganic insulating material is formed on almost the whole surface of a substrate on which a TFT is formed. A pixel electrode formed of a transparent electrode material is formed on the passivation film. The pixel electrode is connected to a source electrode of the TFT through a contact hole opened in the passivation film.

An external connection terminal (hereinafter abbreviated to a drain terminal) connected to a drain bus line includes a lower electrode formed of an $n^+$-type a-Si layer and a metal layer. An upper electrode made of an oxide conductive film of the same material as the pixel electrode is laminated on the lower electrode through the contact hole opened in the passivation film so that oxidation of the lower electrode is prevented. A connection terminal of a drain bus line driving circuit is connected to the upper electrode, and a predetermined gradation voltage is applied to the respective drain bus lines.

An external connection terminal (hereinafter abbreviated to a gate terminal) connected to a gate bus line includes a lower electrode formed of a metal layer constituting a layer common to a gate electrode and the gate bus line. An upper electrode made of an oxide conductive film of the same material as the pixel electrode is laminated on the lower electrode through a contact hole opened in an insulating film constituting a layer common to a gate insulating film and in the passivation film, so that oxidation of the lower electrode is prevented. A connection terminal of a gate bus line driving circuit is connected to the upper electrode and a predetermined gate pulse is sequentially applied to the respective gate bus lines.

Next, a method of manufacturing the reversed stagger type TFT-LCD in which the channel protection film is formed will be outlined. A plurality of gate bus lines and gate terminal lower electrodes are formed on a transparent insulating substrate such as a glass substrate. Next, an insulating film is formed on the whole surface. Incidentally, in this insulating film, its part on the gate electrode is especially called a gate insulating film. Subsequently, an a-S Si layer is formed on the insulating film, and next, a channel protection film is formed. Next, after an $n^+$-type a-S Si layer is formed, a metal layer is formed, and etching is collectively carried out while using the channel protection film as an etching stopper, so that an active semiconductor layer of the a-Si layer is formed on the gate insulating film of a TFT portion, and a source electrode and a drain electrode are formed at both sides of the channel protection film, whereby a TFT is completed.

Besides, at the same time, the drain terminal lower electrode connected to the drain bus line and made of the $n^+$-type a-Si layer and the metal layer is formed.

Next, a passivation film made of an inorganic insulating material, such as an SiN film, an $SiO_2$ film, or a composite film of these, and having a thickness of 400 nm is formed on the whole surface. Next, after a resist is coated, a photolithography method is used to form a resist pattern having openings over the source electrode, the drain terminal lower electrode, and the gate terminal lower electrode. Then, the passivation film or the passivation film and the insulating film are etched using the resist pattern as a mask, so that contact holes are opened.

Next, a transparent conductive film having a thickness of 100 nm and made of ITO or the like is formed on the whole surface by using a sputtering method or the like. Next, the transparent conductive film is patterned into a predetermined shape, and the pixel electrode connected to the source electrode through the contact hole is formed. At the same time, the drain terminal upper electrode connected to the drain terminal lower electrode through another contact hole is formed, and the gate terminal upper electrode connected to the gate terminal lower electrode through still another contact hole is formed.

As stated above, according to the description of the above publication, in the case where the gate terminal and the drain terminal are formed, the gate terminal lower electrode and the drain terminal lower electrode are formed, the passivation film covering the upper portions of the gate terminal lower electrode and the drain terminal lower electrode is formed, the passivation film is etched to open the contact holes, and the gate terminal upper electrode made of the transparent conductive film connected to the gate terminal lower electrode through the contact hole and the drain terminal upper electrode made of the transparent conductive film connected to the drain terminal lower electrode are formed simultaneously with the pixel electrode.

Japanese Patent Laid-Open No. 2000-231123 discloses that an edge portion of a color filter formed for each pixel is overlapped with a light shielding film (black matrix; BM) for shading a storage capacitance bus line intersecting a region between pixels and the inside of a pixel against light, when viewed in the direction of a normal of a substrate surface.

Further, Japanese Patent Laid-Open No. 092022/1979 discloses that a light shielding film is provided on an array substrate or an opposite substrate in order to suppress the generation of leak current due to the photoconductivity of a TFT.

Furthermore, with respect to a CF-on-TFT structure in which a color filter is formed on the side of an array substrate, for example, Japanese Patent Laid-Open No. 140324/1981 discloses that spectroscopic characteristics between adjacent pixels are different and color filters between pixels are stacked to form a columnar spacer.

Besides, in the CF-on-TFT structure, it is well known that a light shielding function is provided by stacking color resins, a wiring line is used as a light shielding film to ensure an opening ratio, and a color resin is overlapped with an edge of a light shielding film.

Besides, Japanese Patent Laid-Open No. 068726/1989 discloses that a pixel is formed on a flattened transparent insulating film which is thin in a region over a TFT and is thick in other regions.

Further, a frame region at an outer periphery of the display region formed by a plurality of pixels arranged in a matrix form is required to function as a light shielding region to block out the leakage light from a backlight. Therefore, in case of an LCD in which CF is formed on the side of the opposite substrate, the light shielding function is provided by laminating a resin CF layer in the frame region or by forming a low reflection Cr(chrome) film. Further, in the LCD with the CF-on-TFT structure, the light shielding function is provided by laminating the resin CF in the frame region.

A case will be considered in which an overcoat (OC) layer of an insulating organic resin material is used instead of the passivation film of the inorganic insulating film disclosed in the above publication of Japanese Patent Laid-Open No. 202153/1994. The film thickness of an inorganic insulating film, such as a silicon nitride film (SiN), is generally as thin as 300 to 400 nm, whereas the OC layer has a feature that its film thickness becomes very thick, for example, 1000 to 3000 nm. Besides, the dielectric constant of a resin forming the OC layer is about 3 or less and is relatively small, and in combination with the large film thickness, the OC layer has a merit that parasitic capacitance to deteriorate TFT characteristics can be reduced.

On the other hand, the OC layer is inferior to the passivation film made of the inorganic insulating material in adhesion to an electrode material formed on an upper layer, and a large stepped portion is formed since the film thickness is large. Thus, defective conduction due to discontinuity of the electrode material formed on the upper layer is apt to occur, and a problem of poor etching, such as formation of a residual substance of the electrode material or the occurrence of thinning of an electrode width, is apt to occur.

Further, also in the case where a contact hole is opened in the OC layer to electrically connect the lower electrode, it becomes necessary to sufficiently consider the shape of the contact hole formed in the thick resin layer of the OC layer or the positional relation between the hole position and the upper and lower electrodes.

Moreover, there also arises a problem that in an inspection process of a wiring pattern formed on a substrate for use in a liquid crystal display, since the film thickness of the resin CF layer is large, it is difficult to focus a measurement device equipped with an incident-light optical system on the wiring pattern of the lower layer of the resin CF layer.

Also, when a BM film is used for block out light at the frame region, a low reflective Cr film or a black resin film is ordinary used as a BM film. However, these formation processes result in a high cost in panel production. When a shield layer is formed by superposing the resin CF layers, there is a laminated structure of three layers of R, G and B or a two-layer structure of the CF resin layers using also the shielding function of the liquid crystal layer to raise the shielding function. However, a problem of light leakage can be produced.

Besides, in the CF-on-TFT structure, in the case where for example, a resin in which a pigment is dispersed as a color component is used for the CF layer, attention must be given to a possibility that an inorganic component of the pigment pollutes a liquid crystal layer and a semiconductor layer. According to the CF-on-TFT structure, basically, it is sufficient if only a common electrode and an alignment film are formed on the side of the opposite substrate, and simplification of the substrate can be realized. However, since the light shielding function conventionally provided on the side of the opposite electrode is also omitted, it becomes an important problem how to cause the array substrate to have the light shielding function optimally.

With respect to the light shielding function of the CF-on-TFT structure, there arise a problem of an erroneous operation due to the photoconductivity of the TFT through the incidence of external light such as room light or sun light, and a problem of the glare of a peripheral frame portion due to leakage light from a backlight in a transmission type display and a drop in contrast of a pixel. With respect to the frame portion of the periphery of a display region, it has been clarified from experimental results that since the light of the backlight is high, it becomes necessary to provide a light shielding film in which resin CF layers of at least two colors are laminated. However, when two layers of the resin CF layers are laminated in the frame portion, and the CR layer of one layer is formed in the pixel of the display region, there arises a problem that the height of the display region becomes different from that of the frame portion, and the cell gap thickness becomes uneven. Even if the OC layer is formed on the whole surface to flatten, since the height of the laminated resin CF layer 42 of the frame portion is relatively large, a sufficient flattening effect can not be obtained.

SUMMARY OF THE INVENTION

The present invention has an object to provide a substrate for use in a liquid crystal display, which can simplify a manufacturing process typified by a photolithography process and has high reliability, a method for manufacturing the same, and a liquid crystal display using the same.

The above object is achieved by a substrate for use in a liquid crystal display, comprising an insulating substrate cooperating with an oppositely arranged opposite substrate to hold a liquid crystal; a pixel electrode formed in each of a plurality of pixel regions arranged in a matrix form on the insulating substrate; a switching element connected to the pixel electrode and a bus line; and an external connection terminal for electrically connecting an external circuit and the bus line, the external connection terminal including a first terminal electrode electrically connected to the bus line, a second terminal electrode made of a forming material of the pixel electrode on the insulating substrate, and an electrode coupling region for electrically connecting the first and the second terminal electrodes.

When a resin layer is formed on the whole surface of the substrate, and an electrode wiring line made of, for example, a transparent oxide electrode material or the like is formed on the resin layer, the adhesion of the wiring line or the like to the resin layer is often inferior to that to a glass substrate, and there is a case where peeling occurs. The peeling of the wiring line or the like can be suppressed by opening the resin layer and patterning while the wiring line or the like is brought into direct contact with the glass substrate. In the case where the opening portion of the resin layer has a linear shape, there is a case where a stepped portion is steep and an etching residual substance of a transparent oxide electrode material or the like is generated between the electrode wiring lines. On the other hand, when an opening pattern of the resin layer between electrode terminals is made a shape with a sharpened tip, the shape of the stepped portion of the selection portion is moderated and the generation of the etching residual substance can be suppressed.

In the CF-on-TFT structure in which the opposite electrode does not have a light shielding film, an intense light leakage from a backlight unit is problematic in the frame region of the periphery of a display region. Thus, in the frame portion, it is necessary to block out the light by superposition of resins of two or more colors. However, in the construction provided with the overcoat (OC) layer, the frame region has the film thickness of a laminate of the two-layer lamination CF layer and the OC layer, and becomes higher than the film thickness of the CF layer of one layer and the OC layer in the display region whereby a difference in level becomes large. The cell thickness of the liquid crystal is changed by this, and display unevenness, the so-called frame unevenness, is produced. In order to deal with this, an opening region is provided such that three layers of CF resin are laminated in the frame region, and the OC layer is not formed in the region. Then, the frame region is exposed to etching of the gate insulating film or the like, so that the uppermost CF layer of the CF resin stacked portion is removed by the etching and the film thickness of the whole frame region is made two layers of the resin CF layers +α, and whereby formation of a noticeable stepped portion relatively to the display region can be prevented.

Besides, after the film thickness of the whole frame region is made two layers of the resin CF layers +α, according to the need, the exposed region of the color filter layer is covered by a transparent electrode pattern in the same process as the formation of the pixel electrodes thereover. Further, by making the transparent electrode and the opposite electrode (common electrode) the same in electric potential, a non-voltage applied state can be realized in the liquid crystal layer on the frame region, thereby a full light shielding capability can be obtained in a display method of a normally-black (NB) type like a MVA(Multi-Domain Vertical Alignment)-LCD.

In the NB type display system such as the MVA-LCD, since the liquid crystal layer substantially has a light shielding function to external light when the TFT is in an off state, if even one layer of a green resin CF layer having highest transmissivity among the resin CF layers exists in the light shielding region, the light shielding function is sufficiently fulfilled, and accordingly, an erroneous operation of the TFT due to the photoconductivity does not occur.

Further, recently, a MVA-LCD which provides pre-tilt angle to liquid crystal molecules appears, where monomer is polymerize by irradiating UV light to the liquid crystal while applying a voltage between the common electrode and the pixel electrode after omitting the formation of bank which is the structure for an alignment regulation on the opposite substrate side and injecting liquid crystal which composes monomer between the opposite substrate and the array substrate. In this case of the MVA-LCD using a technology with the pre-tilt angle using this polymer, it is also desirable to form the transparent electrode pattern in the same process as the formation of the pixel electrode in the exposed region of the color filter layer on the surface of the light shielding region of the frame region. Further, a full light shielding capability can be obtained in the NB type display method because it is possible not to provide the pre-tilt angle to liquid crystal molecules of the region by making the transparent electrode and the opposite electrode or common electrode the same in electric potential to make the liquid crystal layer on the light shielding region in the frame region non voltage-applied state.

The reversed stagger type TFT includes two kinds, an NSI (channel etch) type and an ISI (channel protection film) type, of typical images, and in any structures, there is a problem of pollution of an active semiconductor layer of a-Si or the like by a pigment component contained in the resin CF layer.

Concerning the problem of the pollution in the case where the resin CF layer is directly formed on the TFT, it has been found that the degree of pollution is changed by the difference in volume resistivity of the forming material of the resin CF layer.

A material having low volume resistivity stores an electric charge and produces ghosting. Accordingly, it is preferable that the volume resistivity of the CF material is as high as possible. Further, it is preferable that an inorganic insulating film of SiN or the like is provided as an interlayer insulating film on the TFT. In this case, as compared with the film thickness of 300 to 400 nm of the gate insulating film or the protection film used for a conventional LCD, a very thin film thickness, for example, a film thickness of about 10 to 150 nm is sufficient, and preferably, the film thickness is about 50 to 120 nm.

In the CF-on-TFT structure, since the OC layer exists in which not a conventional stepped portion of several tens to several hundreds nm, a stepped portion of several thousands nm is formed, defective focus occurs in an inspection device of an incident-light optical system, or defective identification of patterns occurs by the existence of the CF resin.

To these problems, for example, by providing an opening pattern on a storage capacitance electrode, and further providing a similar opening pattern on the CF layer of the upper layer, it is possible to eliminate the absorption of the incident light by the CF layer, which becomes an obstacle to automatic focusing, and the superposition of the opening pattern of the storage capacitance electrode and the opening pattern opened in the pixel electrode can be measured.

With respect to the shape of the contact hole for electrically connecting the source electrode of the TFT and the pixel electrode, when the relation between diameters of contact holes of the CF layer, the SiN layer and the OC layer existing over the source electrode is made CF layer>SiN layer>OC layer, a structure can be formed such that the CF resin is covered with the OC layer in the vertical direction, and it is possible to remove the influence of pollution due to the pigment or the like in the resin CF layer upon the liquid crystal or the TFT.

In the case where the volume resistivity of the CF resin is large and there is no problem of pollution or the like, for the purpose of preventing discontinuity of the pixel electrode from occurring, it is preferable that the contact hole diameters are made OC layer>CF layer>SiN layer.

The OC layer or the CF layer is made of an organic resin, and the thermal expansion coefficient is smaller than that of glass by one digit. Besides, since the thermal expansion coefficient is also different from that of the transparent oxide conductive film used for the pixel electrode by one digit, there is a case where the pixel electrode cracks by thermal stress.

Since the crack caused by the difference in thermal expansion coefficient is apt to be generated in the contact hole as a stepped portion, a contact hole structure capable of relieving the stress is needed.

In order to decrease the crack at the contact hole, it is necessary to take a sufficient distance between the pixel electrode edge and the contact hole, and preferably, a distance of 6 μm or more is needed. This distance is also correlated with the film thickness of the resin film.

The positional relation between the resin film and the contact hole is important, and the occurrence of the crack can be suppressed when the distance of the pixel edge portion is made 2.5 or more times as large as the film thickness of the OC layer, the distance of a taper portion at the end of the contact hole is made 1.5 or more times as large as the film thickness, or the angle is made 45° or less.

DETAILED DESCRIPTION OF THE PREFERRED EMBODIMENTS

A substrate for use in a liquid crystal display according to a first embodiment of the present invention, a method of manufacturing the same, and a liquid crystal display using the same will be described with reference to FIGS. 1 to 45 and FIG. 50. First, a rough construction of a liquid crystal display according to this embodiment will be described with reference to FIG. 1. The liquid crystal display according to this embodiment has a construction in which a TFT substrate (array substrate) 1 on which TFTs 2 or the like are formed is made opposite to an opposite substrate 4 on which a common electrode and the like are formed and is bonded thereto, and a liquid crystal is sealed between them. The TFT substrate 1 has a CF-on-TFT structure in which a resin CF layer of, for example, a pigment dispersion type is formed on the side of a formation surface of the TFTs 2, and an OC layer made of an insulating organic resin material is formed on its upper layer.

Figure 2:
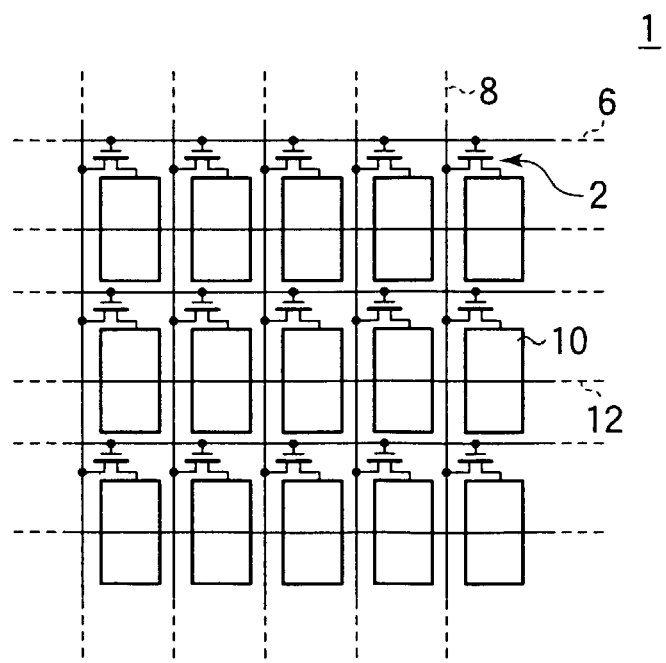
FIG. 2 is a view showing an equivalent circuit on the side of a TFT substrate of the liquid crystal display according to the first embodiment of the present invention.

FIG. 2 shows an equivalent circuit of elements formed on the TFT substrate 1. A plurality of gate bus lines 6 extending in the horizontal direction in the drawing are formed in parallel with each other, and a plurality of drain bus lines 8 intersecting with them at substantially right angles and extending in the vertical direction in the drawing are formed in parallel with each other on the TFT substrate 1. Respective regions surrounded by the plurality of gate bus lines 6 and the plurality of drain bus lines 8 become pixel regions. The TFT 2 and a pixel electrode 10 are formed in each of the pixel regions. A drain electrode of each of the TFTs 2 is connected to the adjacent drain bus line 8, a gate electrode is connected to the adjacent gate bus line 6, and a source electrode is connected to the pixel electrode 10. A storage capacitance bus line 12 is formed through substantially the center portion of each of the pixel regions and in parallel with the gate bus line 6. The TFTs 2, the pixel electrodes 10, and the respective bus lines 6, 8 and 12 are formed by a photolithography process, and are formed by repeating a series of semiconductor processes of "film formation→resist coating→exposure→development→etching→resist peeling".

Referring to FIG. 1 again, the TFT substrate 1 arranged opposite to the opposite substrate 4 to seal a liquid crystal is provided with a gate bus line driving circuit 14 on which a driver IC for driving the plurality of gate bus lines 6 is mounted and a drain bus line driving circuit 16 on which a driver IC for driving the plurality of drain bus lines 8 is mounted. These driving circuits 14 and 16 output scanning signals or data signals to the predetermined gate bus lines 6 or drain bus lines 8 on the basis of predetermined signals outputted from a control circuit 18. A polarizing plate 20 is disposed on a substrate surface of the TFT substrate 1 at the side reverse to its element formation surface, and a backlight unit 22 is attached to a surface of the polarizing plate 20 at the side reverse to the TFT substrate 1. A polarizing plate 24 arranged in crossed Nicols to the polarizing plate 20 is bonded to a surface of the opposite substrate 4 at the side reverse to a common electrode formation surface.

Figure 3:
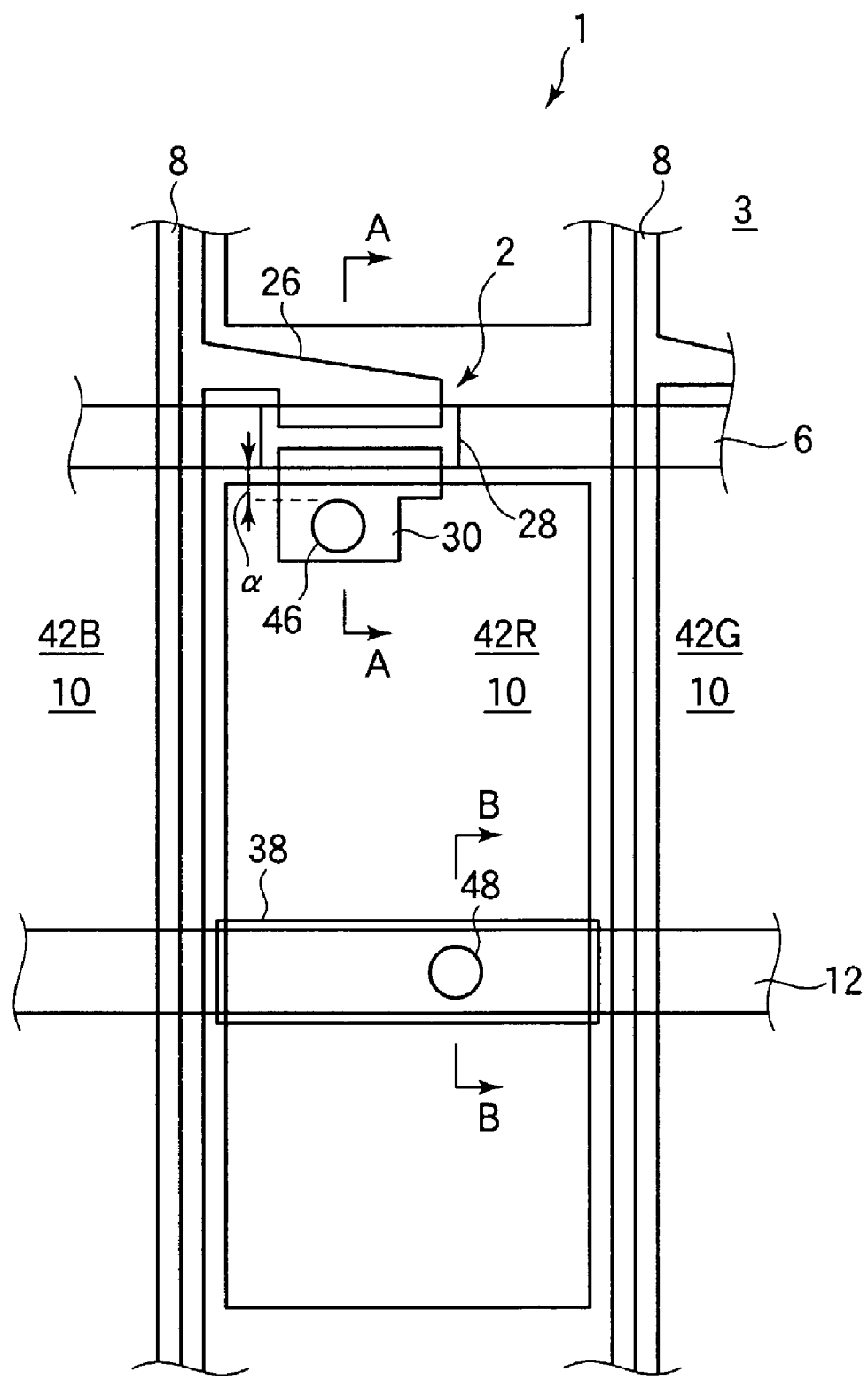
FIG. 3 is a view showing a state of one pixel on a glass substrate 3 in the case of a substrate for use in a liquid crystal display according to the first embodiment of the present invention when viewed from the side of a liquid crystal layer.
Figure 4:
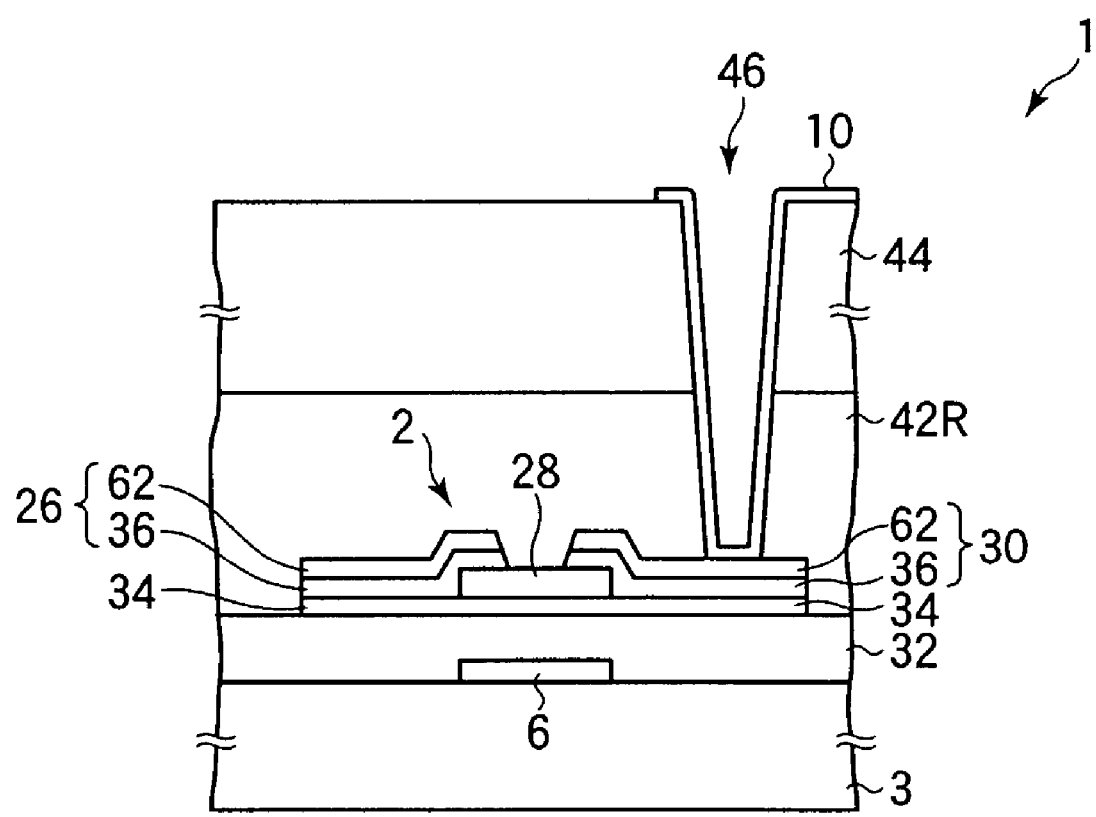
FIG. 4 is a view showing a section taken along line A—A of FIG. 3.
Figure 5:
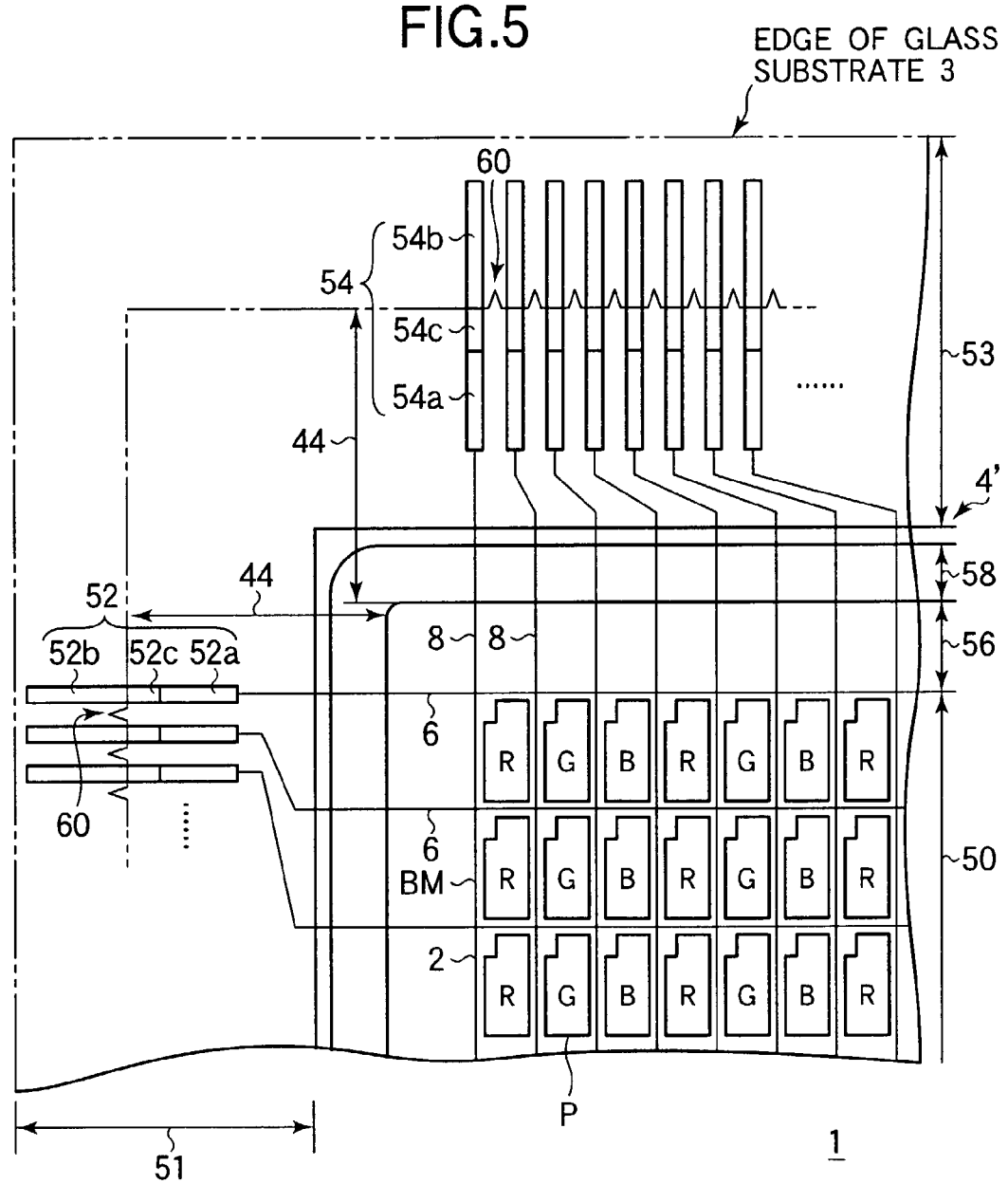
FIG. 5 is a view showing a state of a TFT substrate 1 in the substrate for use in the liquid crystal display according to the first embodiment of the present invention when viewed from the side of the liquid crystal layer, and a construction in the vicinity of a frame region.
Figure 6:
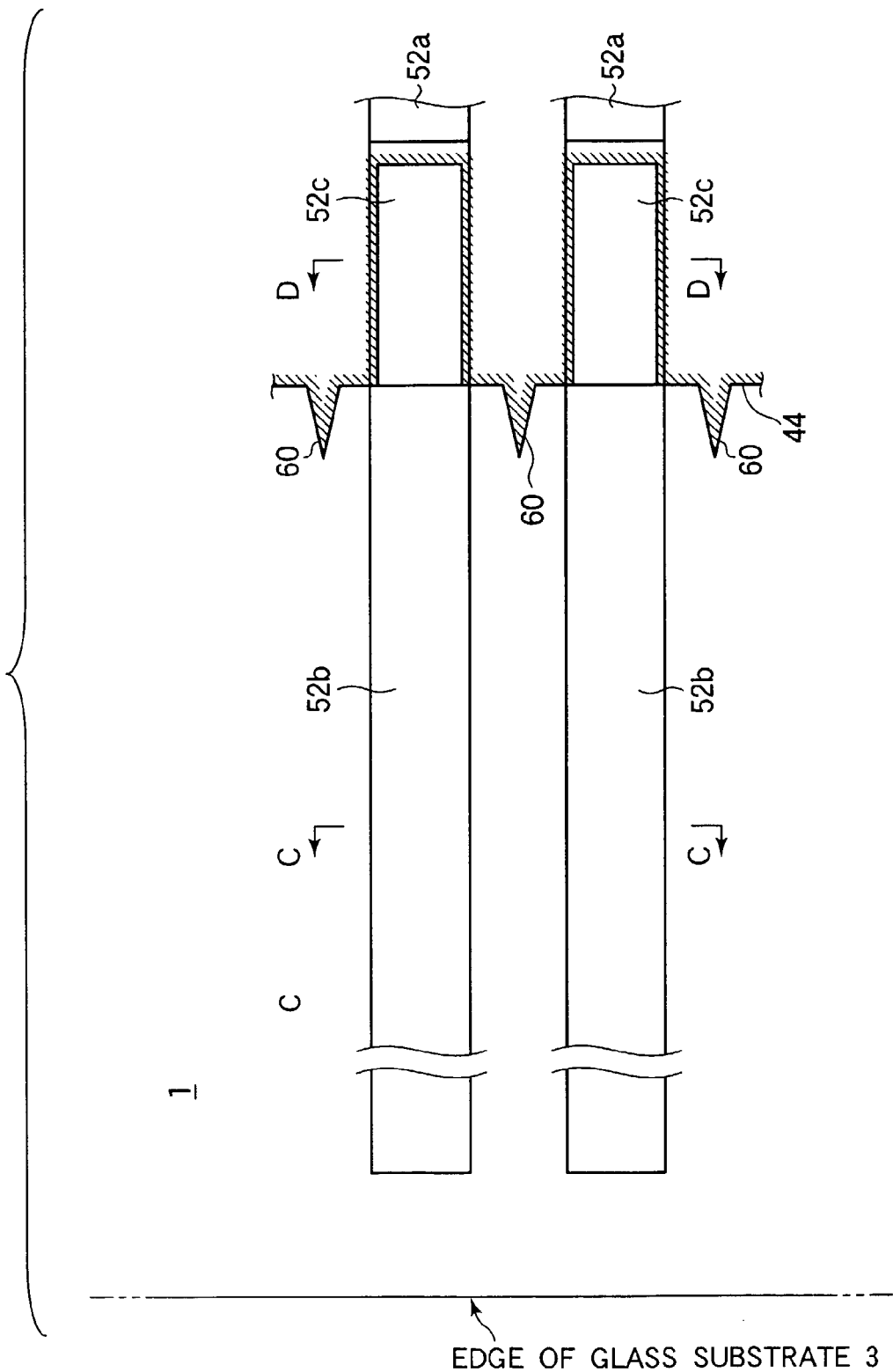
FIG. 6 is a view showing a construction in the vicinity of a gate terminal on the glass substrate 3 in the case of the substrate for use in the liquid crystal display according to the first embodiment of the present invention.
Figure 7:
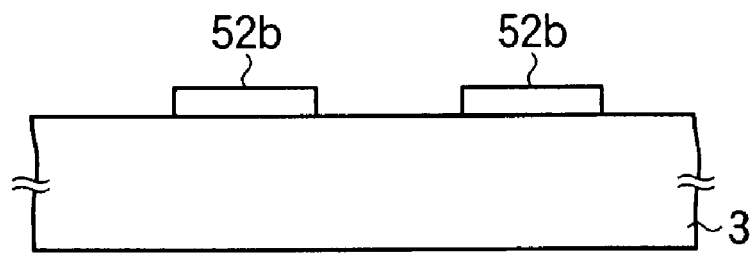
FIG. 7 is a view showing a section taken along line C—C of FIG. 6.
Figure 8:
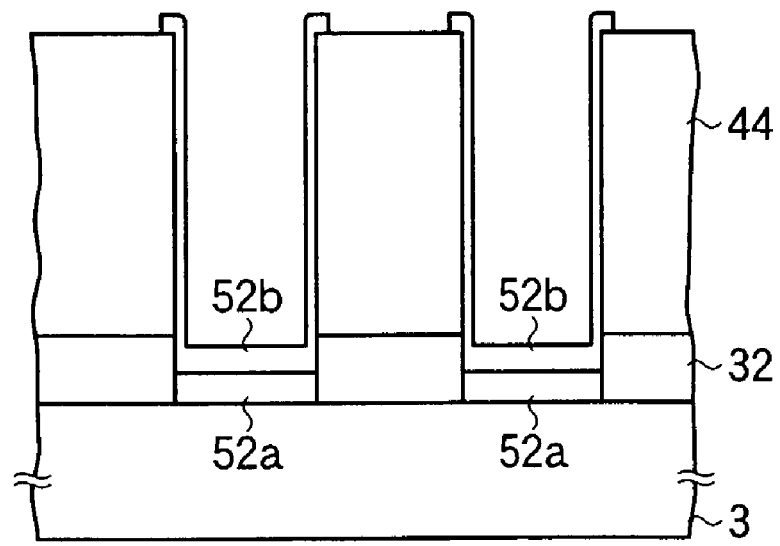
FIG. 8 is a view showing a section taken along line D—D of FIG. 6.
Figure 9:
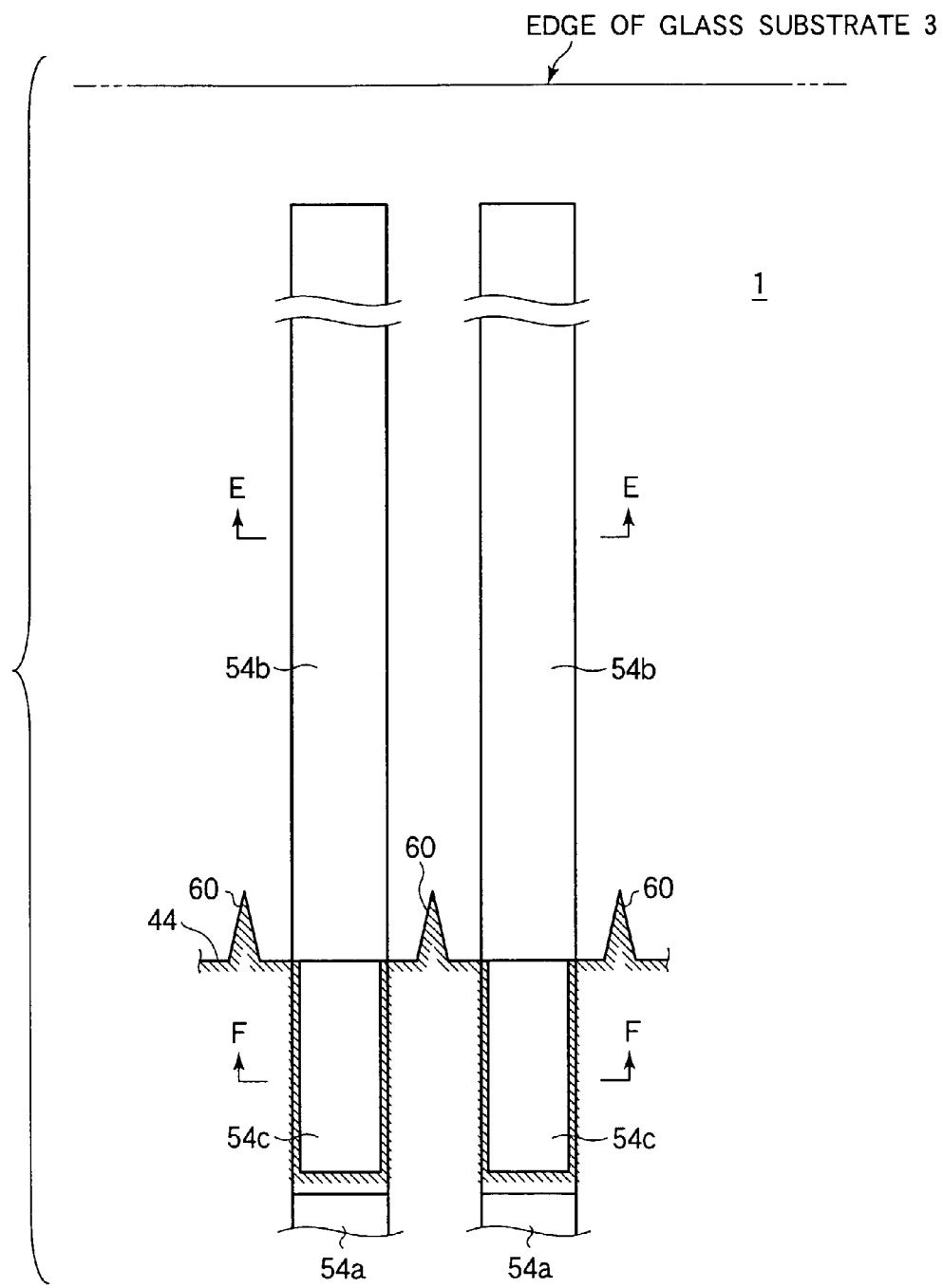
FIG. 9 is a view showing a construction in the vicinity of a drain terminal on the glass substrate 3 in the case of the substrate for use in the liquid crystal display according to the first embodiment of the present invention.
Figure 10:
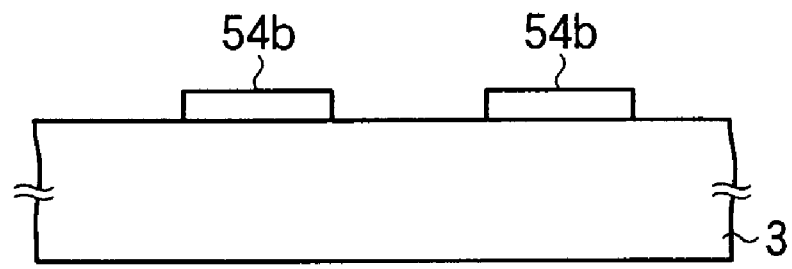
FIG. 10 is a view showing a section taken along line E—E of FIG. 9.
Figure 11:
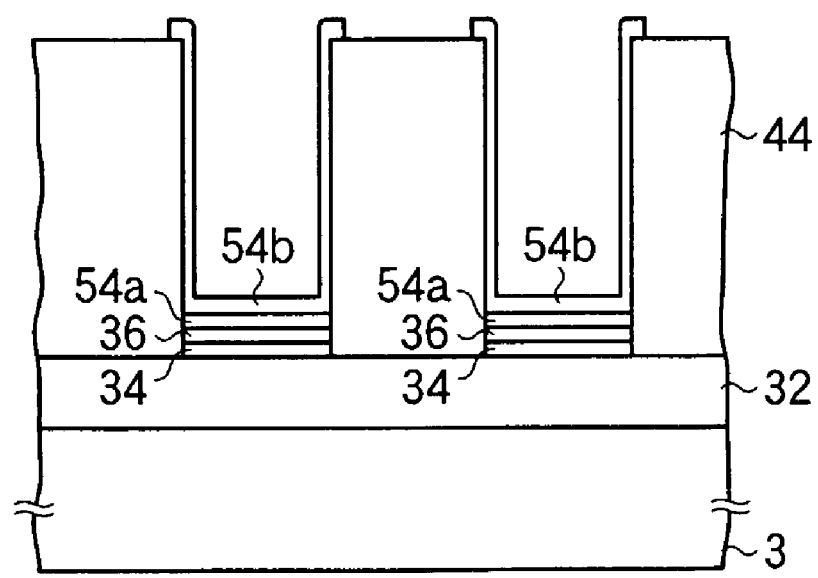
FIG. 11 is a view showing a section taken along line F—F of FIG. 9.
Figure 12:
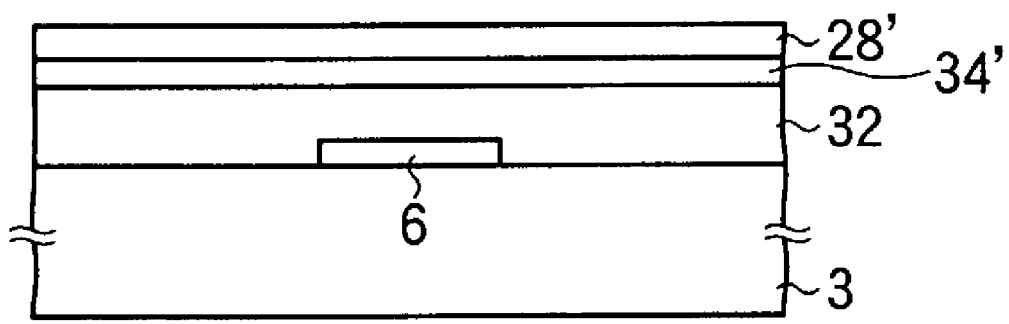
FIG. 12 is a manufacturing process sectional view (No. 1) of a TFT formation region taken along line A—A of FIG. 3 in the substrate for use in the liquid crystal display according to the first embodiment of the present invention.
Figure 13:
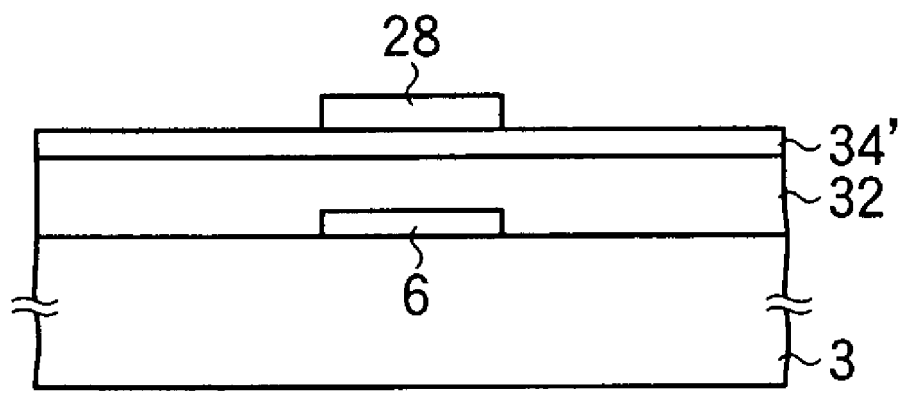
FIG. 13 is a manufacturing process sectional view (No. 2) of the TFT formation region taken along line A—A of FIG. 3 in the substrate for use in the liquid crystal display according to the first embodiment of the present invention.
Figure 14:
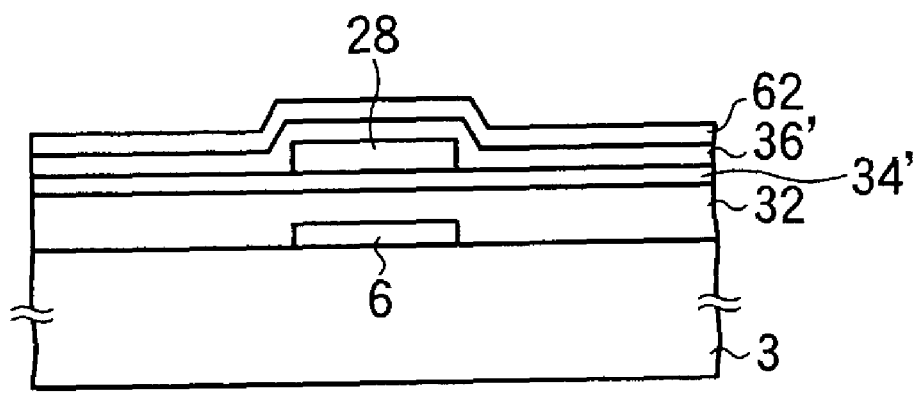
FIG. 14 is a manufacturing process sectional view (No. 3) of the TFT formation region taken along line A—A of FIG. 3 in the substrate for use in the liquid crystal display according to the first embodiment of the present invention.
Figure 50:
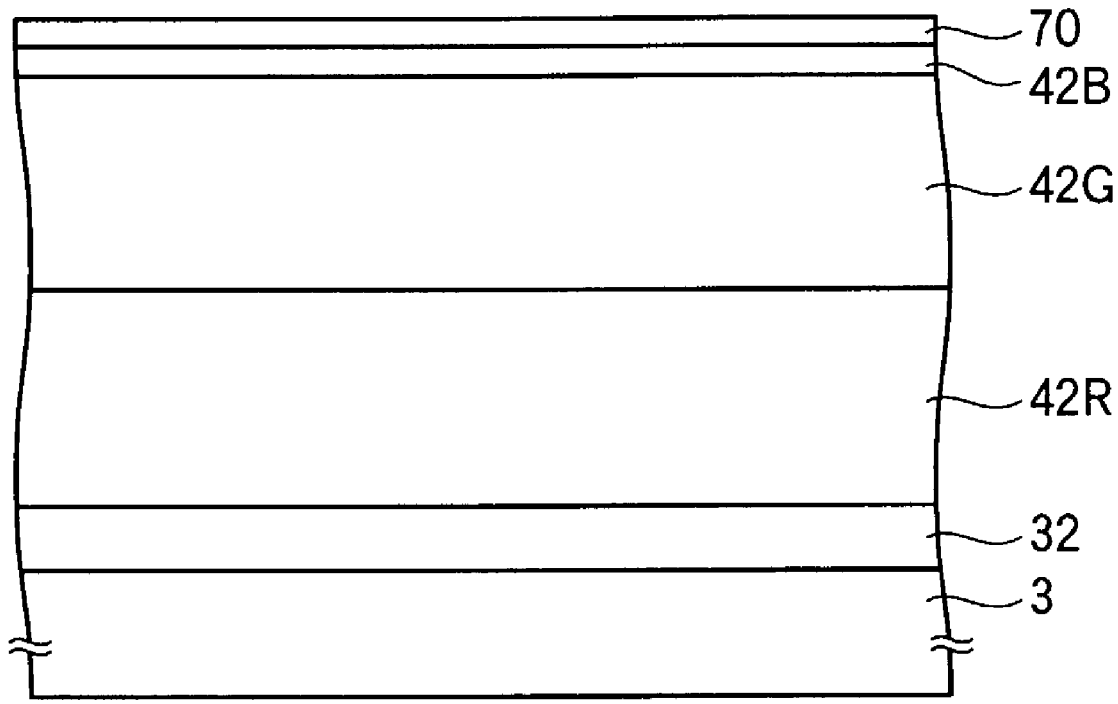
FIG. 50 is a sectional structure view of the vicinity of the frame region 56 of the TFT substrate 1 in the liquid crystal display substrate according to the first embodiment of this invention and also shows a section along the extending direction of the gate bus line 6 or the drain bus line 8.

Next, the construction of the TFT substrate 1 as the substrate for use in the liquid crystal display according to this embodiment will be described with reference to FIGS. 3 to 11 and FIG. 50. FIG. 3 shows a state of one pixel on a glass substrate 3 when viewed from the side of a liquid crystal layer. FIG. 4 shows a section taken along line A—A of FIG. 3. FIG. 5 shows a state of the TFT substrate 1 viewed from the side of the liquid crystal layer and a construction of the vicinity of a frame region. FIG. 6 shows a construction of the vicinity of a gate terminal on the glass substrate 3. FIGS. 7 and 8 show sections taken along line C—C and line D—D of FIG. 6. FIG. 9 shows a construction of the vicinity of a drain terminal on the glass substrate 3. FIGS. 10 and 11 show sections taken along line E—E and line F—F of FIG. 9. FIG. 50 shows a sectional structure of the vicinity of a frame region 56 shown in FIG. 5 and it also shows a section along the extending direction of the gate bus line 6 or the drain bus line 8.

First, as shown in FIGS. 3 and 4, a plurality of gate bus lines 6 (only one line is shown in FIG. 3) extending in the horizontal direction in the drawing are formed on the glass substrate 3 as a transparent insulating substrate. Besides, a plurality of drain bus lines 8 (only two lines are shown in FIG. 3) intersecting with the gate bus lines 6 through an insulating film (a film just over the gate bus line 6 is called a "gate insulating film") 32 and extending in the vertical direction in FIG. 3 are formed on the glass substrate 3. Regions defined by these gate bus lines 6 and the drain bus lines 8 become pixel regions. A TFT 2 is formed in the vicinity of an intersection position between each of the gate bus lines 6 and each of the drain bus lines 8. As shown in FIGS. 3 and 4, a drain electrode 26 of the TFT 2, constituted by an upper metal layer 62 and an ohmic contact layer 36, is led out from the drain bus line 8 at the left side in FIG. 3 and is formed so that its end portion is positioned at the side of one edge on a channel protection film 28 formed over the gate bus line 6. A source electrode 30 constituted by an upper metal layer 62 and an ohmic contact layer 36 is formed at the side of the other edge on the channel protection film 28 to be opposite to the drain electrode 26. In the construction as stated above, a region of the gate bus line 6 just under the channel protection film 28 functions as a gate electrode of the TFT 2. As shown in FIG. 4, a gate insulating film 32 is formed over the gate bus line 6, and an active semiconductor layer 34 constituting a channel and made of, for example, amorphous silicon (a-Si) is formed between the gate insulating film 32 and the channel protection film 28 of the upper layer. The active semiconductor layer 34 is connected to the ohmic contact layers 36 of, for example, $n^+$-Si layers of the drain/source electrodes 26 and 30.

Besides, as shown in FIG. 3, a storage capacitance bus line 12 extending horizontally through substantially the center portion of the pixel region is formed. A storage capacitance electrode 38 is formed over the storage capacitance bus line 12 in the pixel region through the insulating film 32.

A predetermined resin CF layer 42R (Red), 42G (Green) or 42B (Blue) is formed for each pixel on the whole surface of the pixel region including an upper layer of the TFT 2 shown in FIG. 4 and a not-shown upper layer of the storage capacitance electrode 38.

An OC layer 44 is formed on the resin CF layers 42R, 42G and 42B of the pixel regions. A transparent oxide electrode material is patterned to form a pixel electrode 10 on the OC layer 44 of each pixel. The pixel electrode 10 is electrically connected to the source electrode 30 through a contact hole 46 formed by opening the OC layer 44 and any one of the resin CF layers 42R, 42G and 42B. Similarly, the pixel electrode 10 is electrically connected to the storage capacitance electrode 38 through a contact hole 48 formed by opening the OC layer 44 and any one of the resin CF layers 42R, 42G and 42B.

Next, a construction of the vicinity of a frame region of the TFT substrate 1 will be described with reference to FIG. 5 and FIG. 50. Incidentally, in FIG. 5, in order to clearly show respective structural elements, the ratio of dimensions of a display region 50, a frame region 56, formation regions 51 and 53 of gate terminal/drain terminal, and the like is different from actual one. As shown in FIG. 5, a plurality of pixel regions P arranged in a matrix form are formed on the TFT substrate 1, and the TFT 2 is formed in each of the pixel regions P. The display region 50 of an image is constituted by the plurality of pixel regions P. The respective gate bus lines 6 are respectively connected to a plurality of gate terminals 52 formed in the gate terminal formation region 51 of an outer periphery of the TFT substrate 1, and are connected to the gate bus line driving circuit 14 (see FIG. 1) provided at the outside.

Similarly, the respective drain bus lines 8 are respectively connected to a plurality of drain terminals 54 formed in the drain terminal formation region 53 of an outer periphery of the TFT substrate 1, and are connected to the drain bus line driving circuit 16 (see FIG. 1) provided at the outside.

In FIG. 5, reference numeral 4' designates an edge position of the opposite substrate 4 at the time when the TFT substrate 1 and the opposite substrate 4 are bonded to each other. The edge 4' is positioned inside the edge of the TFT substrate 1 by approximately a size of the formation region of the gate terminal/drain terminal.

The resin CF layer 42 of at least one layer is formed at the peripheral portion of each of the pixel regions P in the display region 50, and functions as a light shielding layer (BM). The BM layer is used for ensuring a contrast by defining the plurality of pixel regions P in the display region 50 and for preventing the occurrence of light leak current by shading the TFT 2.

Figure 1:
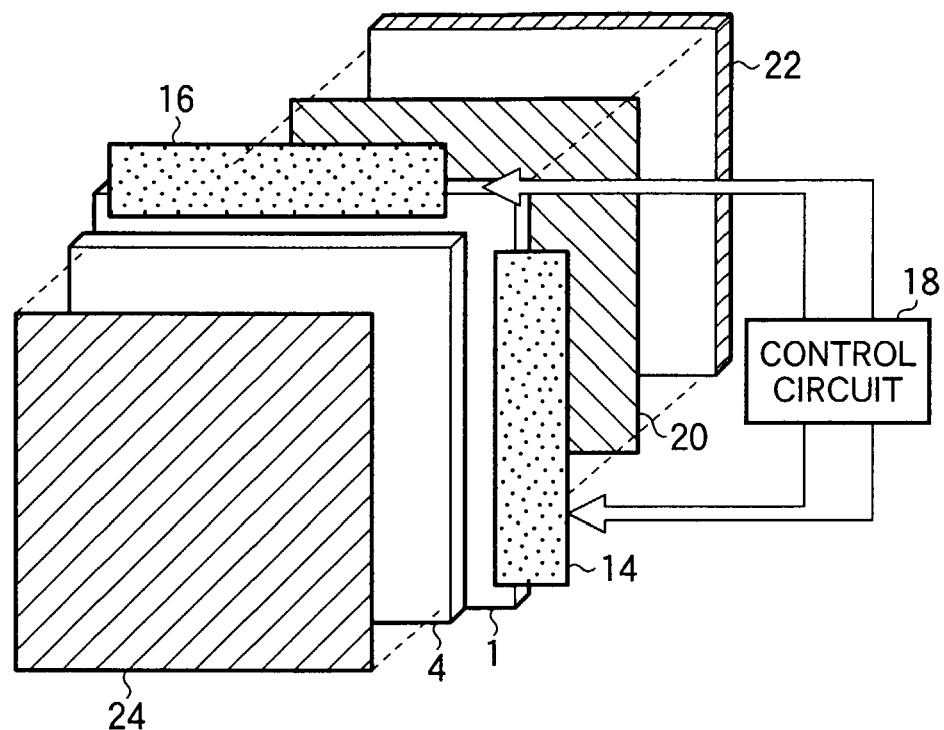
FIG. 1 is a view showing a construction of a liquid crystal display according to a first embodiment of the present invention.

As shown in FIG. 50, a BM layer formed by laminating at least two layers of the resin CF layers 42R, 42G and 42B is provided in the frame region 56 of the outer periphery of the display region 50 in order to block out the unnecessary light from the backlight unit 22 in the outer periphery of the display region 50 (see FIG. 1). In an example shown in FIG. 50, the resin CF layers 42R and the 42G are laminated in this order and also a thin layer of the resin CF layer 42B is laminated.

Besides, in order to bond the TFT substrate 1 to the opposite substrate 4, a main seal (sealing agent) 58 made of photo-curing resin is formed at the periphery of the frame region of the TFT substrate 1.

The OC layer 44 is not formed in the frame region 56, but is formed in a region indicated by a bilateral arrow 44 in the display region 50, the main seal 58, and the formation regions 51, 53 of the gate terminal/drain terminal shown in FIG. 5.

In the area in which no OC layer 44 in the frame region 56 is formed, a protection film 70 is formed by a transparent conductive film material, for example, such as ITO used for the pixel electrode 10 to prevent pollution of the liquid crystal caused by the resin CF layer 42.

When the both substrates are attached, the protection film 70 having the conductivity is connected to the common electrode on the opposite substrate 4 which is not shown. Incidentally, when the both substrates are attached, the common electrode is electrically separated from the storage capacitance bus line 12 or connected at least at a high resistance state.

The common electrode on the opposite substrate 4 and the storage capacitance bus line 12 on the TFT substrate 1 are held at the same potential through a transfer by mounting the gate bus line driving circuit 14 and the drain bus line driving circuit 16.

Next, the construction of the gate terminal will be described with reference to FIGS. 6 to 8. FIG. 6 enlargedly shows two of the plurality of gate terminals 52 shown in FIG. 5. In FIGS. 5 and 6, the gate terminal 52 includes a first terminal electrode 52a and a second terminal electrode 52b. Besides, an electrode coupling region 52c for electrically connecting both the electrodes 52a and 52b is provided. The first terminal electrode 52a is formed of the forming material of the gate bus line 6 simultaneously with the formation of the gate bus line 6. On the other hand, the second terminal electrode 52b is formed of the forming material of the pixel electrode 10 simultaneously with the formation of the pixel electrode 10 formed on the OC layer 44.

As shown in FIG. 6 and FIG. 8 showing a section taken along line D—D of FIG. 6, the OC layer 44 is opened at the electrode coupling region 52c, and further, the gate insulating film 32 of the lower layer is also opened, and the surface of the first terminal electrode 52a is exposed.

The OC layer 44 between the adjacent gate terminals 52 includes an end face substantially coincident with an end face of the first terminal electrode 52a on the side of the electrode coupling region 52c. Further, the OC layer 44 includes a protrusion 60 which protrudes from substantially the center portion of the end face and in which a sectional shape parallel to a substrate surface of the glass substrate 3 is formed into, for example, a triangular shape having a vertical angle of an acute angle.

As shown in FIG. 8, in the electrode coupling region 52c, the second terminal electrode 52b is formed just over the first terminal electrode 52a, and both the electrodes 52a and 52b are electrically connected to each other.

By the construction as stated above, since the OC layer 44 does not exist on the formation region of the second terminal electrode 52b in the gate terminal formation region 51, as shown in FIG. 7 showing a section taken along line C—C of FIG. 6, the second terminal electrode 52b is directly formed on the glass substrate 3 in the direction toward the end of the glass substrate 3 from the electrode coupling region 52c.

Although the above description has been given of the gate terminal formation region 51, the drain terminal formation region 53 also has an almost similar construction. Next, the construction of the drain terminal 54 will be described with reference to FIGS. 9 to 11. FIG. 9 enlargedly shows two of the plurality of drain terminals 54 shown in FIG. 5. In FIGS. 5 and 9, the drain terminal 54 includes a first terminal electrode 54a and a second terminal electrode 54b. Besides, an electrode coupling region 54c for electrically connecting both the electrodes 54a and 54b is provided. The first terminal electrode 54a is formed of the forming material of the drain bus line 8 simultaneously with the formation of the drain bus line 8. On the other hand, the second terminal electrode 54b is formed of the forming material of the pixel electrode 10 simultaneously with the formation of the pixel electrode 10 formed on the OC layer 44.

As shown in FIG. 9 and FIG. 11 showing a section taken along line F—F of FIG. 9, the OC layer 44 at the electrode coupling region 54c is opened and the surface of the first terminal electrode 54a is exposed.

Besides, the OC layer 44 between the adjacent drain terminals 54 includes an end face substantially coincident with an end face of the first terminal electrode 54a on the side of the electrode coupling region 54c. Further, the OC layer 44 includes a protrusion 60 which protrudes from substantially the center portion of the end face and in which a sectional shape parallel to the substrate surface of the glass substrate 3 is formed into, for example, a triangular shape having a vertical angle of an acute angle.

As shown in FIG. 11, the second terminal electrode 54b is formed just over the first terminal electrode 54a in the electrode coupling region 54c, and both the electrodes 54a and 54b are electrically connected to each other.

By the construction as stated above, since the OC layer 44 does not exist on the formation region of the second terminal electrode 54b in the drain terminal formation region 53, as shown in FIG. 10 showing a section taken along line E—E of FIG. 9, the second terminal electrode 54b is directly formed on the glass substrate 3 in the direction toward the end of the glass substrate 3 from the electrode coupling region 54c.

Incidentally, in addition to the structure of the drain terminal 54 of the above construction, for example, the drain terminal 54 including a wiring layer of the same layer as the gate terminal 52 may be formed in the drain terminal formation region 53 simultaneously with the formation of the gate terminal 52 by using the forming material of the gate bus line 6. In this case, two electrode coupling regions are formed, and for example, the first terminal electrode 54a is constituted by a wiring line formed of the same layer metal as the drain bus line 8 and extending from the drain bus line 8, and a wiring line connected to the end of the wiring line in a first electrode coupling region and formed of the forming material of the pixel electrode 10 extending from that. Then, the second terminal electrode 54b in which the forming material of the pixel electrode 10 extending from the first terminal electrode 54*a* is laminated on the surface of the terminal electrode formed of the forming material of the gate bus line 6 is formed from a second electrode coupling region toward the leading-edge portion.

Next, a method of manufacturing the liquid crystal display shown in FIGS. 1 to 11 and FIG. 50 will be described with reference to FIGS. 12 to 45. Incidentally, in FIGS. 12 to 45, the same structural elements as the structural elements shown in FIGS. 1 to 11 and FIG. 50 are designated by the same reference characters. Here, among FIGS. 12 to 45, FIGS. 12 to 18 are manufacturing process sectional views of a TFT formation region taken along line A—A of FIG. 3. FIGS. 19 to 25 are manufacture process sectional views of a storage capacitance formation region taken along line B—B of FIG. 3, which is a region extending through the contact hole 48. FIGS. 26 to 29 are manufacturing process sectional views of a region of the second terminal electrode 52*b* of the gate terminal 52 taken along line C—C of FIG. 6. FIGS. 30 to 34 are manufacturing process sectional views of the electrode coupling region 52*c* of the gate terminal 52 taken along line D—D of FIG. 6. FIGS. 35 to 38 are manufacturing process sectional views of the second terminal electrode 54*b* of the drain terminal 54 taken along line E—E of FIG. 9. FIGS. 39 to 43 are manufacturing sectional views of the electrode coupling region 54*c* of the drain terminal 54 taken along line F—F of FIG. 9.

After a protection film of $SiO_x$ or the like is formed on a glass substrate 3 as a transparent insulating substrate directly or as the need arises, for example, a film of Al (aluminum) alloy having a thickness of, for example, 130 nm, a film of MoN (molybdenum nitride) having a thickness of, for example, 70 nm, and a film of Mo (molybdenum) having a thickness of, for example, 15 nm are formed in this order on the whole surface by sputtering, so that a metal layer having a thickness of about 215 nm is formed. As the aluminum alloy, a material containing Al and at least one or two or more of Nd (neodymium), Si (silicon), Cu (copper), Ti (titanium), W (tungsten), Ta (tantalum), Sc (scandium) and the like can be used.

Next, after a resist layer is formed on the whole surface, a resist mask is formed by exposure using a first mask (photomask or reticle, hereinafter referred to as a mask), and a gate bus line 6 (see FIG. 12), a storage capacitance bus line 12 (see FIG. 19), and a first terminal electrode 52*a* (see FIG. 26) of a gate terminal 52 are formed by a wet etching using a phosphoric acid system etchant.

Next, for example, a silicon nitride film (SiN) having a thickness of about 400 nm is formed on the whole surface of the substrate by a plasma CVD method to form a gate insulating film (called an interlayer insulating film according to a position of film formation; hereinafter, called a gate insulating film or an insulating film according to a position of film formation) 32. Next, for example, an amorphous silicon (a-Si) layer 34' for formation of an active semiconductor layer 34 is formed to a thickness of about 30 nm on the whole surface of the substrate by the plasma CVD method. Further, for example, a silicon nitride film (SiN) 28' for formation of a channel protection film (etching stopper) 28 is formed to a thickness of about 120 nm on the whole surface by the plasma CVD method (see FIGS. 12, 19, 26, 30, 35 and 39).

Next, after a photoresist (not shown) is coated on the whole surface by spin coating or the like, back exposure is performed to the transparent glass substrate 3 while using the gate bus line 6 and the storage capacitance bus line 12 as masks. The resist layer in the exposed region is dissolved so that a resist pattern (not shown) is formed in a self-aligning manner on the gate bus line 6, the storage capacitance bus line 12, and the first terminal electrode 52*a* of the gate terminal 52. This resist pattern is further exposed from the forward direction while using a second mask, so that a resist pattern is formed in which the resist layer remains only on a formation region of the channel protection film 28. A dry etching using a fluorine-based gas is performed to the silicon nitride film 28' while using this pattern as an etching mask, so that the channel protection film 28 is formed (see FIGS. 13, 20, 27, 31, 36 and 40).

Next, after the surface of the amorphous silicon layer 34' is washed (removal of a natural oxide film) using dilute hydrogen fluoride, as shown in FIGS. 14, 21, 28, 32, 37 and 41, for example, an $n^+$ a-Si layer 36' for formation of an ohmic contact layer 36 is quickly formed to a thickness of about 30 nm on the whole surface of the transparent glass substrate 3 by the plasma CVD method. Next, a metal layer 62 constituted by, for example, Ti/Al/Ti films for formation of a drain electrode 26, a source electrode 30, a storage capacitance electrode 38, a drain bus line 8, and a first terminal electrode 54*a* of a drain terminal 54 is formed by sputtering so that the respective films have thicknesses of 20/75/40 nm. As the metal layer 62, a single body of Cr (chromium), Mo (molybdenum), Ta (tantalum), Ti (titanium) or Al (aluminum), or a composite film of those may be used in addition to the composite film of Ti/Al/Ti or the like.

Next, a photoresist layer (not shown) is formed on the whole surface of the substrate, and after the resist is exposed using a third mask, the resist layer is patterned by development. While the patterned resist layer is used as an etching mask (not shown), a dry etching using a chlorine-based gas is performed to the metal layer 62, the $n^+$ a-Si layer 36', and the amorphous silicon layer 34', so that the drain bus line 8, the first terminal electrode 54*a* of the drain terminal 54, the drain electrode 26, the source electrode 30, the storage capacitance electrode 38, the ohmic layer 36, and the active semiconductor layer 34 are formed as shown in FIGS. 15, 22, 29, 33, 38 and 42. In this etching treatment, since the channel protection film 28 functions as an etching stopper, the amorphous silicon layer 34' of the lower layer is not etched but remains, and a desired active semiconductor layer 34 is formed.

Figure 15:
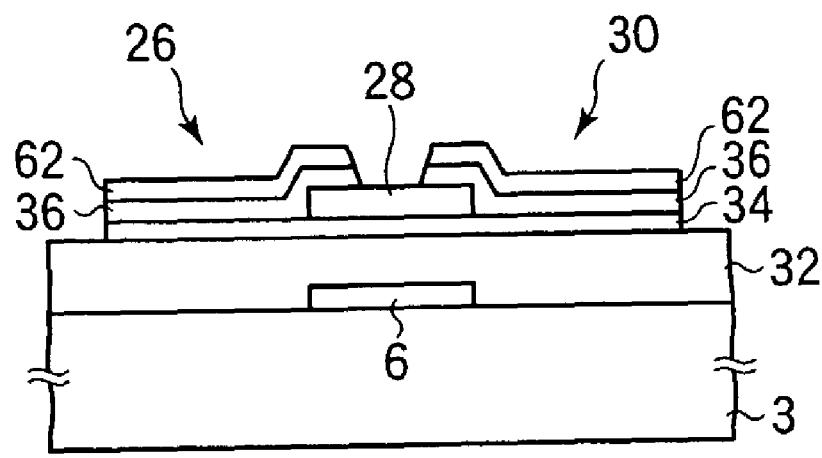
FIG. 15 is a manufacturing process sectional view (No. 4) of the TFT formation region taken along line A—A of FIG. 3 in the substrate for use in the liquid crystal display according to the first embodiment of the present invention.
Figure 22:
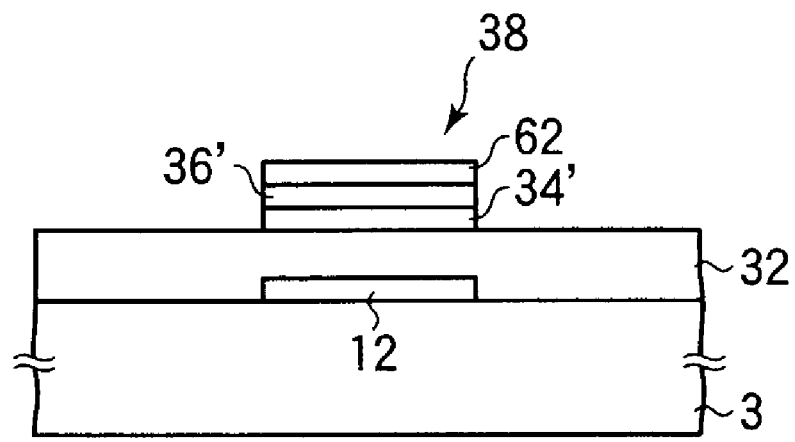
FIG. 22 is a manufacturing process sectional view (No. 4) of the storage capacitance formation region taken along line B—B of FIG. 3 in the substrate for use in the liquid crystal display according to the first embodiment of the present invention, which is the region extending through the contact hole 48.
Figure 23:
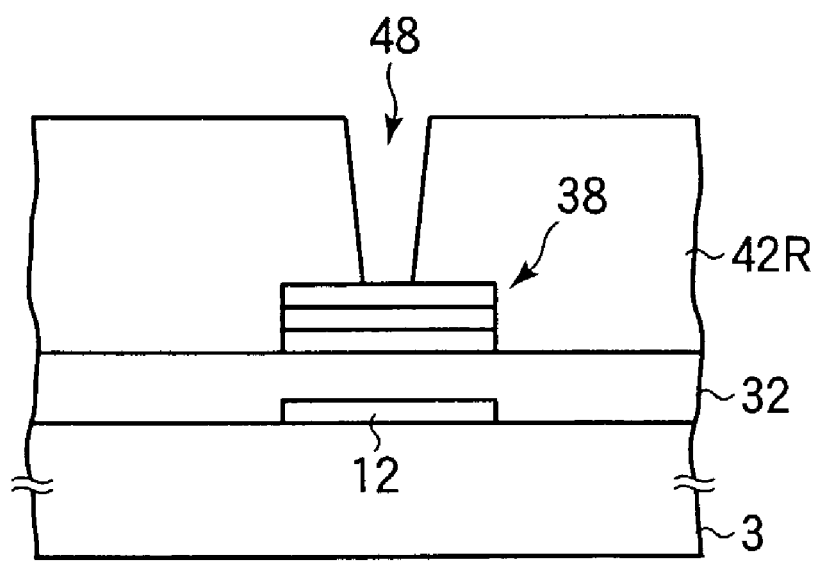
FIG. 23 is a manufacturing process sectional view (No. 5) of the storage capacitance formation region taken along line B—B of FIG. 3 in the substrate for use in the liquid crystal display according to the first embodiment of the present invention, which is the region extending through the contact hole 48.
Figure 42:
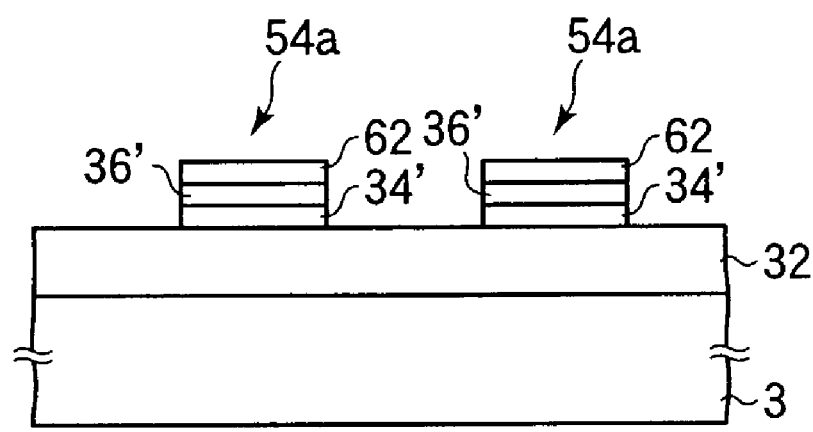
FIG. 42 is a manufacturing process sectional view (No. 4) of the electrode coupling region 54c of the drain terminal 54 taken along line F—F of FIG. 9 in the substrate for use in the liquid crystal display according to the first embodiment of the present invention.

When the above process is completed, as shown in FIG. 42, the first terminal electrode 54*a* in which the amorphous silicon layer 34', the $n^+$ a-Si layer 36', and the metal layer 62 are laminated in this order, is formed in the drain terminal 54. Besides, as shown in FIG. 15, the active semiconductor layer 34 is formed over the gate bus line 6 through the gate insulating film 32, and an original of a TFT structure is formed in which the channel protection film 28, the drain electrode 26, and the source electrode 30 are provided on the active semiconductor layer 34. The drain electrode 26 and the source electrode 30 are formed to have such a structure that the ohmic contact layer 36 and the metal layer 62 are laminated in this order. Besides, as shown in FIG. 22, the amorphous silicon layer 34' is formed over the storage capacitance bus line 12 through the insulating film 32, and the storage capacitance electrode 38 in which the $n^+$ a-Si layer 36' and the metal layer 62 are laminated in this order is formed thereon.

Next, resin CF layers 42R, 42G and 42B are respectively formed for respective pixel regions P of R, G and B. As shown in the pixel regions P of FIG. 5, the resin CF layers 42R, 42G and 42B are formed into a stripe shape so that the same color is arranged in the vertical direction.

First, for example, an acrylic negative photosensitive resin in which a red (R) pigment is dispersed is coated to a thickness of, for example, 170 nm on the whole surface of the glass substrate 3 by using a spin coater, a slit coater or the like. Next, a pattern is exposed by close exposure (proximity exposure) using a large mask so that the resin remains into a stripe shape in the predetermined lines of pixel regions P. Next, the red resin CF layer 42R is formed by development using an alkaline developing solution such as KOH. By this, the red spectrum characteristic is given to the red pixel region P, and a light shielding function to obstruct the incidence of external light to the TFT 2 can be added (see FIGS. 16 and 23).

Similar to the above, an acrylic negative photosensitive resin in which a blue (B) pigment is dispersed, is coated and is patterned, so that the blue resin CF layer 42B of the stripe shape is formed in the pixel regions P of the adjacent line of the red resin CF layer 42R. By this, the blue spectrum characteristic is given to the blue pixel regions P, and the light shielding function to obstruct the incidence of external light to the TFT 2 is added.

Further, an acrylic negative photosensitive resin in which a green (B) pigment is dispersed, is coated and is patterned, so that the stripe-like green resin CF layer 42G is formed in the pixel regions P adjacent to the red resin CF layer 42R and the blue resin CF layer 52B. By this, the green spectrum characteristic is given to the green pixel regions P, and the light shielding function to obstruct the incidence of external light to the TFT 2 is added.

The resin CF layers 42R, 42G and 42B are formed in the display region 50 shown in FIG. 5 and FIG. 50 and in the frame region 56 inside of the main seal. The three layers of the resin CF layers 42R, 42G and 42B are laminated in the frame region 56.

Figure 44:
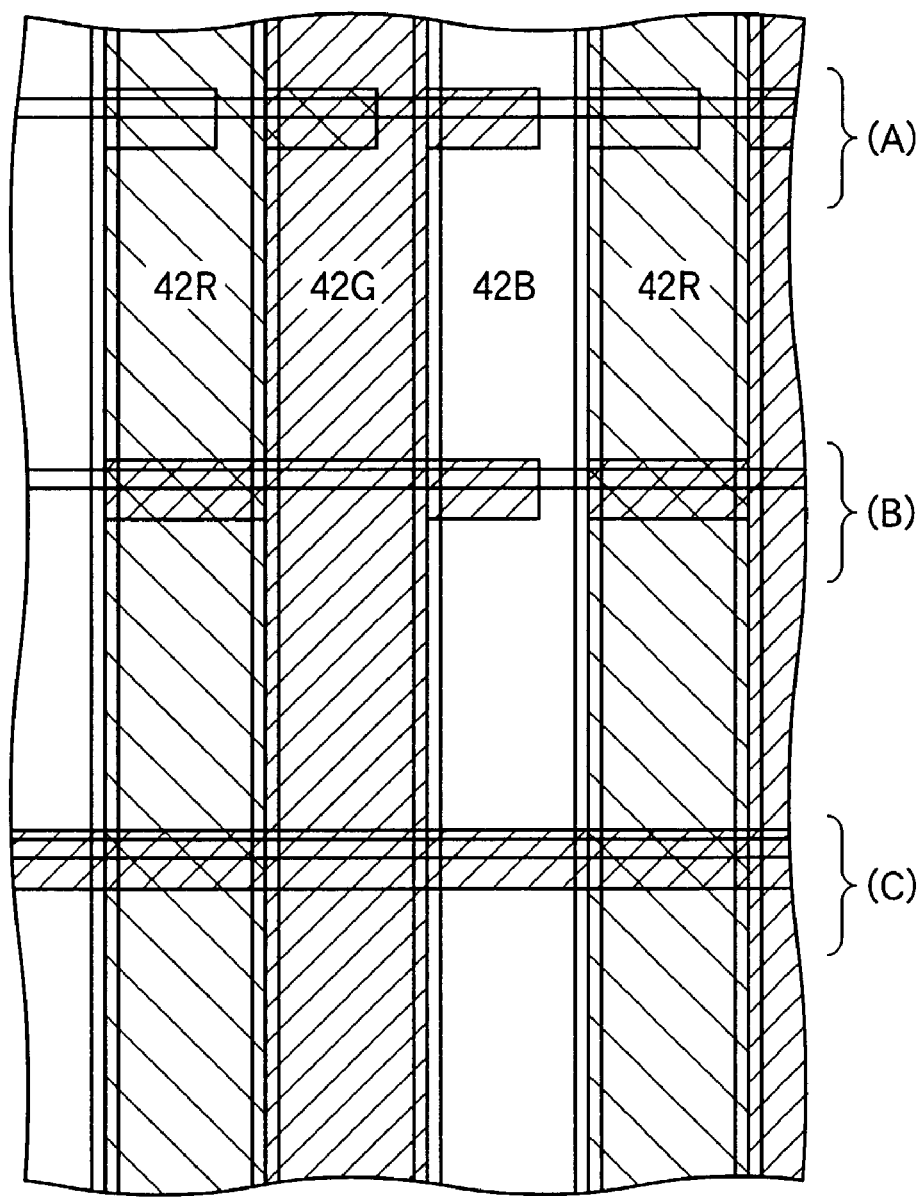
FIG. 44 is a view showing a state of a plurality of pixel regions P in which resin CF layers 42R, 42G and 42B are formed in the substrate for use in the liquid crystal display according to the first embodiment of the present invention, viewed in the direction of a normal of the glass substrate 3.

In the above process, although any one of the resin CF layers 42R, 42G and 42B is formed for each of the pixel regions P, for example, it is preferable to adopt the laminate structure as shown in FIG. 44. FIG. 44 shows a state of the plurality of pixel regions P in which the resin CF layers 42R, 42G, 42B are formed, viewed in the direction of a normal of a substrate surface of the glass substrate 3. The resin CF layer 42 exemplified at a row (A) in FIG. 44 has a ⊢-shaped pattern protruding to cover the TFT 2 of the right adjacent pixel. By this, since the portion over the TFT 2 of each of the pixel regions P has a two-layer laminate structure of the resin CF layers, the light shielding capability can be further improved.

In an example shown at a row (B) in FIG. 44, the green resin CF layer 42G having highest transmissivity of visible light has a T-shaped (or cruciform) pattern protruding to cover the TFTs 2 of the neighboring pixels. By this, since the portions over the TFTs 2 of the pixel regions P of red and blue have a two-layer laminate structure in which the green resin CF layer 42G is overlapped, the light shielding capability can be further improved.

In an example at a row (C) of FIG. 44, the green resin CF layer 42G having highest transmissivity of visible light has a pattern protruding over the whole in the row direction to cover the TFTs 2. By this, since the portions over the TFTs 2 of the red and blue pixel regions P have a two-layer structure in which the green resin CF layer 42G is overlapped, the light shielding capability can be further improved.

With respect to the light shielding function, the problem of external light is not very important in the LCD of the NB (normally black) mode. Even if the pixel and the bus line are not overlapped, since an electric field is not applied between pixel wiring lines, a black display is produced, and there hardly occurs a drop in contrast. However, in order to prevent the influence of photoconductivity, minimum light shielding becomes necessary in the portion over the TFT 2. As a result of experiments, it has been found that in the case where three colors of R, G and B are realized by the resin CF layers 42, even when the G (green) resin CF layer 42G of highest transmissivity of visible light is used, a sufficient light shielding effect in relation to the photoconductivity can be obtained by only one layer.

Accordingly, it is also possible to form a light shielding layer of a single layer structure of only the resin CF layer 42G in which the ⊢-shaped pattern or the T-shaped or cruciform pattern protruding to the adjacent pixels is formed of the green resin CF layer 42G having the highest transmissivity of visible light, and the other resin CF layers 42R and 42B are not formed in the upper and lower layers of the pattern. It is desirable that the single layer pattern of the light shielding resin CF layer 42G in this case is formed so that it covers only the necessary region in the vicinity of the gate bus line 6 and does not enter the formation regions of the resin CF layers 42R and 42B in the pixel regions when viewed in the direction of a normal of a substrate surface.

In view of the above, the portion over the TFT 2 has only to be selectively shaded against light by the resin CF layer 42 to satisfy the light shielding function.

The formation order of the color resins in the laminate structure of the resin CF layers as stated above is arbitrary, and in this example, they are formed in the order of R, G and B. However, it is necessary to consider a possibility that the resin CF exerts a bad influence such as pollution on the liquid crystal layer or the TFT 2, and from this viewpoint, in the resin CF layer in direct contact with the TFT 2, it is desirable to use the resin CF layer made of a material having the highest volume resistivity among the resin CF layers 42R, 42G and 42B. The desirable resistivity is $10^{16}$ Ω·cm or more, and preferably, $2.0 \times 10^{16}$ to $2.2 \times 10^{16}$ Ω·cm or more.

Figure 16:
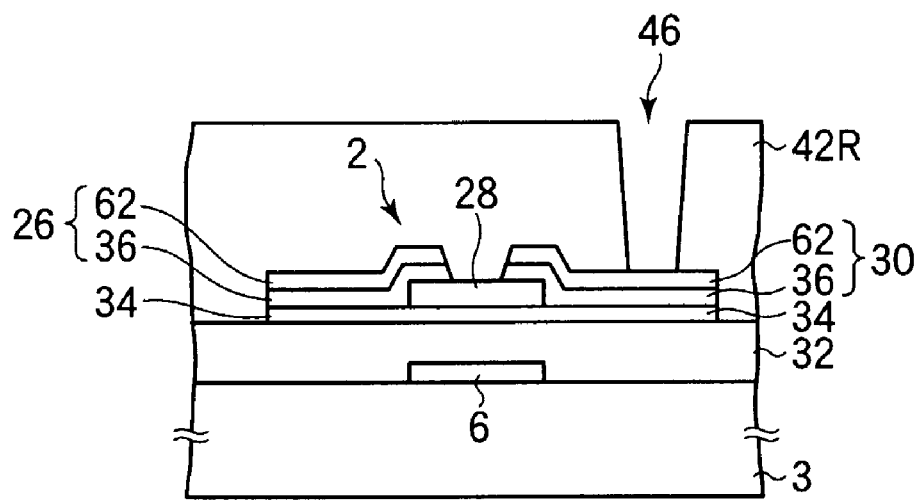
FIG. 16 is a manufacturing process sectional view (No. 5) of the TFT formation region taken along line A—A of FIG. 3 in the substrate for use in the liquid crystal display according to the first embodiment of the present invention.

After the resin CF layers 42R, 42G and 42B are formed, subsequently, contact holes 46 are opened in the resin CF layers 42R, 42G and 42B of the upper layers of the source electrodes 30 of the TFTs 2 (see FIG. 16). Similarly, contact holes 48 are opened in the resin CF layers 42R, 42G and 42B on the storage capacitance electrodes 38 (see FIG. 23).

Figure 17:
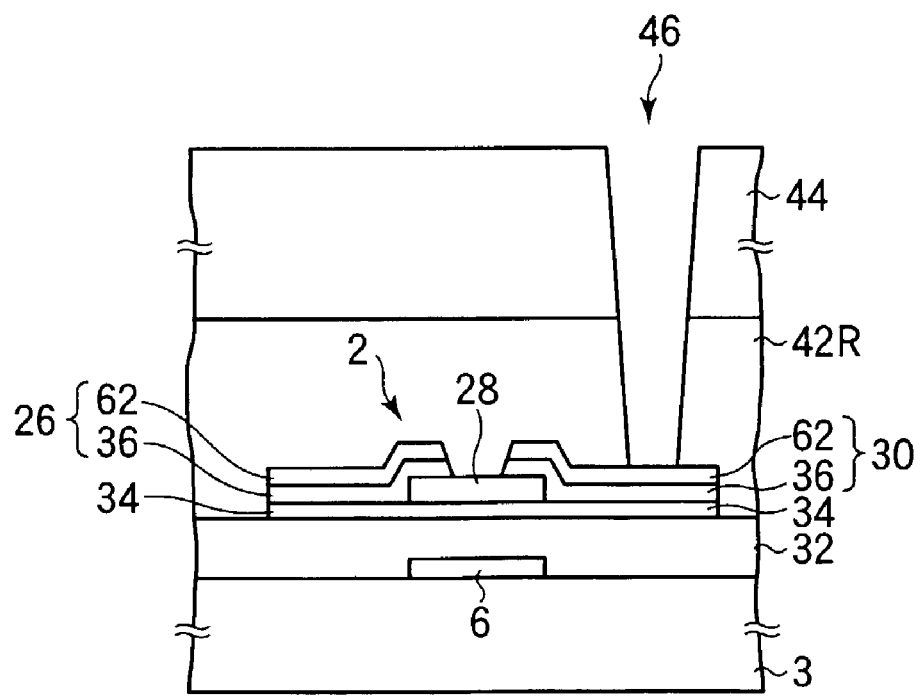
FIG. 17 is a manufacturing process sectional view (No. 6) of the TFT formation region taken along line A—A of FIG. 3 in the substrate for use in the liquid crystal display according to the first embodiment of the present invention.
Figure 24:
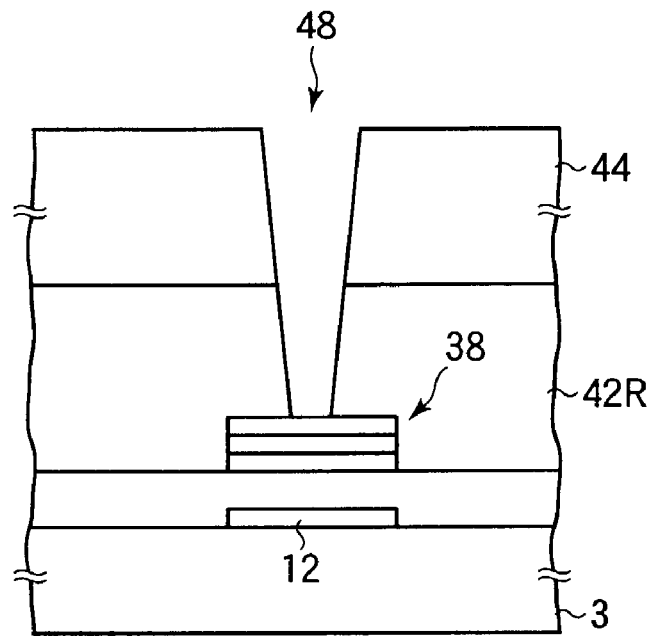
FIG. 24 is a manufacturing process sectional view (No. 6) of the storage capacitance formation region taken along line B—B of FIG. 3 in the substrate for use in the liquid crystal display according to the first embodiment of the present invention, which is the region extending through the contact hole 48.

Next, as shown in FIGS. 17 and 24, an OC layer 44 is formed. Similarly to the formation of the resin CF layer, an OC resin is coated on the whole surface of the glass substrate 3 using a spin coater, a slit coater or the like, and a heat treatment at a temperature of 140° C. or lower is carried out. The used OC resin is an acrylic resin having negative photosensitivity. Next, proximity exposure is performed using a large mask, and development is performed using an alkaline developing solution such as KOH, so that the OC layer 44 is formed.

Figure 34:
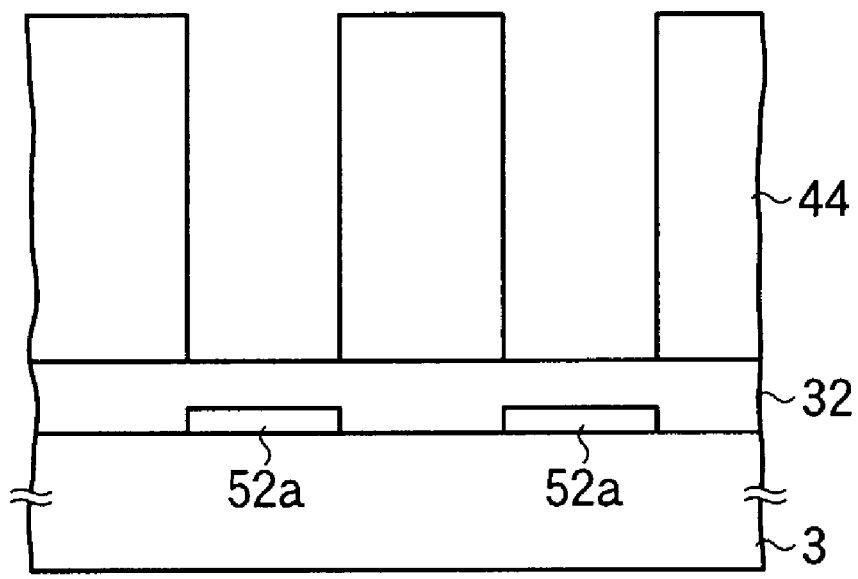
FIG. 34 is a manufacturing process sectional view (No. 5) of the electrode coupling region 52c of the gate terminal 52 taken along line D—D of FIG. 6 in the substrate for use in the liquid crystal display according to the first embodiment of the present invention.
Figure 35:
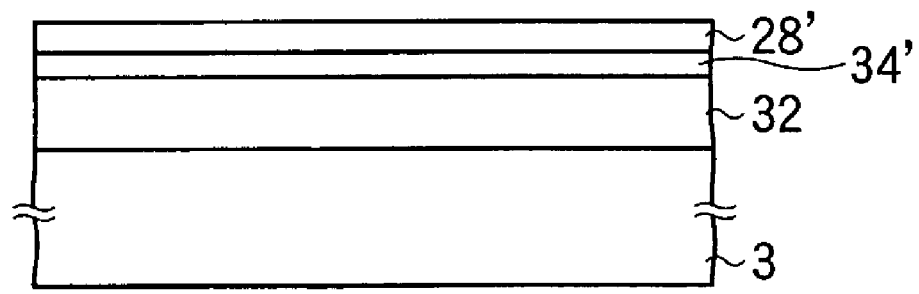
FIG. 35 is a manufacturing process sectional view (No. 1) of a second terminal electrode 54b of a drain terminal 54 taken along line E—E of FIG. 9 in the substrate for use in the liquid crystal display according to the first embodiment of the present invention.
Figure 36:
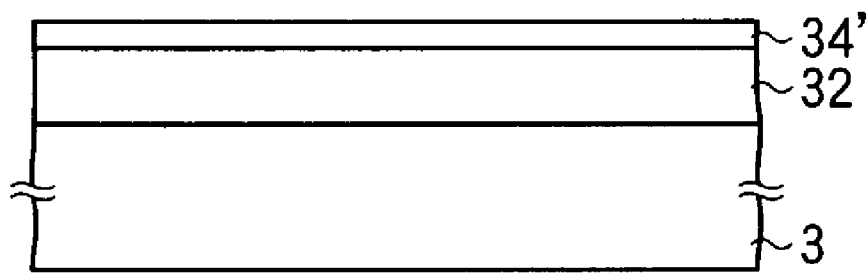
FIG. 36 is a manufacturing process sectional view (No. 2) of the second terminal electrode 54b of the drain terminal 54 taken along line E—E of FIG. 9 in the substrate for use in the liquid crystal display according to the first embodiment of the present invention.
Figure 37:
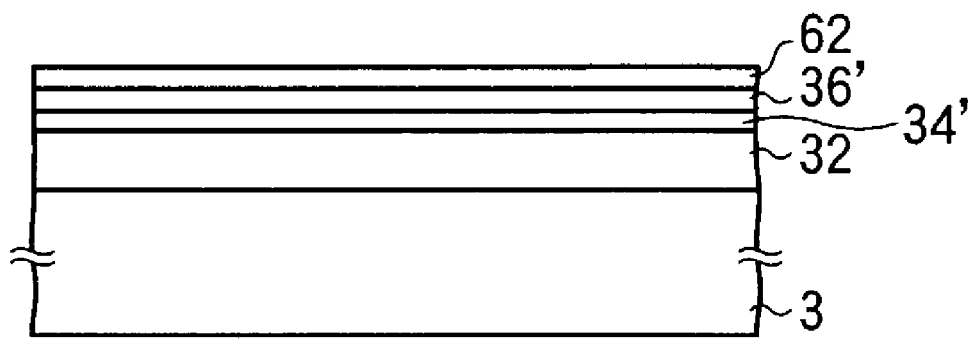
FIG. 37 is a manufacturing process sectional view (No. 3) of the second terminal electrode 54b of the drain terminal 54 taken along line E—E of FIG. 9 in the substrate for use in the liquid crystal display according to the first embodiment of the present invention.
Figure 38:
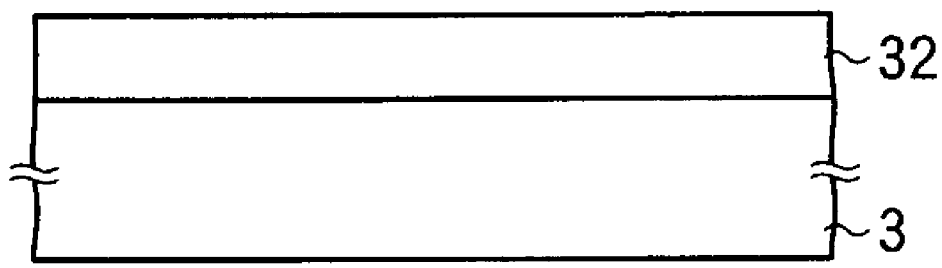
FIG. 38 is a manufacturing process sectional view (No. 4) of the second terminal electrode 54b the drain terminal 54 taken along line E—E of FIG. 9 in the substrate for use in the liquid crystal display according to the first embodiment of the present invention.
Figure 39:
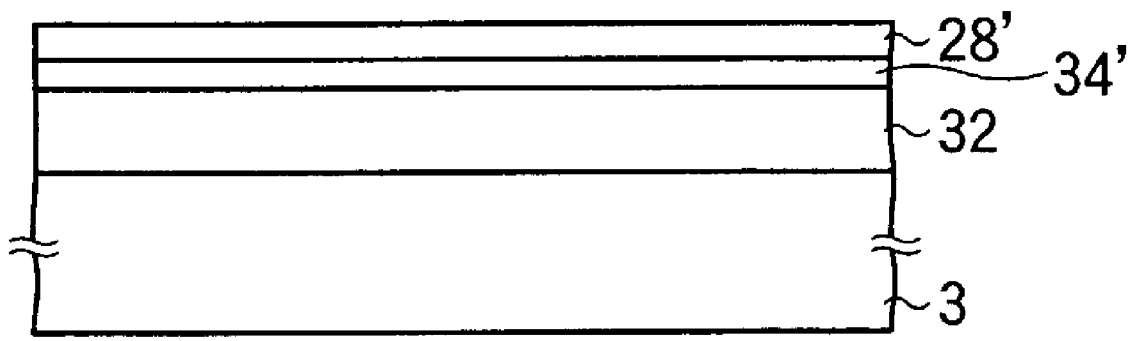
FIG. 39 is a manufacturing process sectional view (No. 1) of an electrode coupling region 54c of the drain terminal 54 taken along line F—F of FIG. 9 in the substrate for use in the liquid crystal display according to the first embodiment of the present invention.
Figure 40:
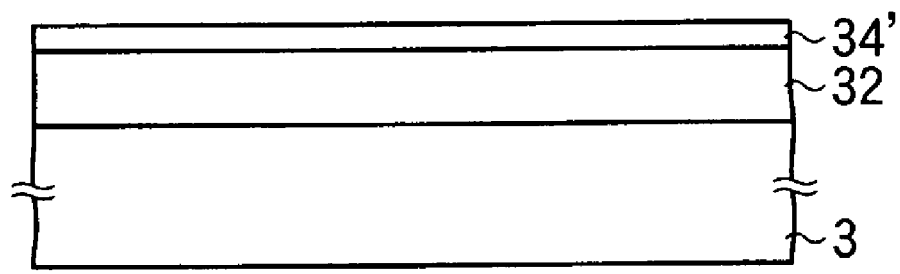
FIG. 40 is a manufacturing process sectional view (No. 2) of the electrode coupling region 54c of the drain terminal 54 taken along line F—F of FIG. 9 in the substrate for use in the liquid crystal display according to the first embodiment of the present invention.
Figure 41:
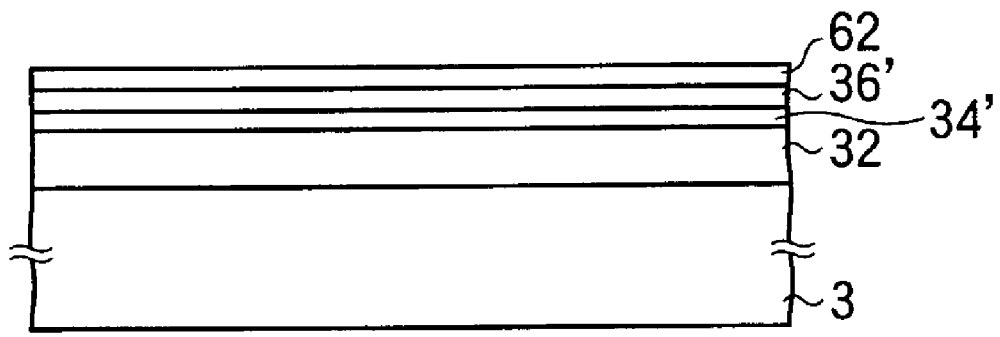
FIG. 41 is a manufacturing process sectional view (No. 3) of the electrode coupling region 54c of the drain terminal 54 taken along line F—F of FIG. 9 in the substrate for use in the liquid crystal display according to the first embodiment of the present invention.

As shown in FIG. 34, the patterned OC layer 44 is opened at the electrode coupling region 52c of the gate terminal formation region 51, and the insulating film 32 is exposed at the bottom portion.

Besides, between the adjacent gate terminals 52, an end face of the OC layer 44 is formed to be almost coincident with an end face of the first terminal electrode 52a on the side of the electrode coupling region 52c. Further, a protrusion 60 is formed which protrudes from substantially the center portion of the end face of the OC layer 44 and in which a sectional shape parallel to the substrate surface of the glass substrate 3 is formed into, for example, a triangular shape having a vertical angle of an acute angle.

Figure 43:
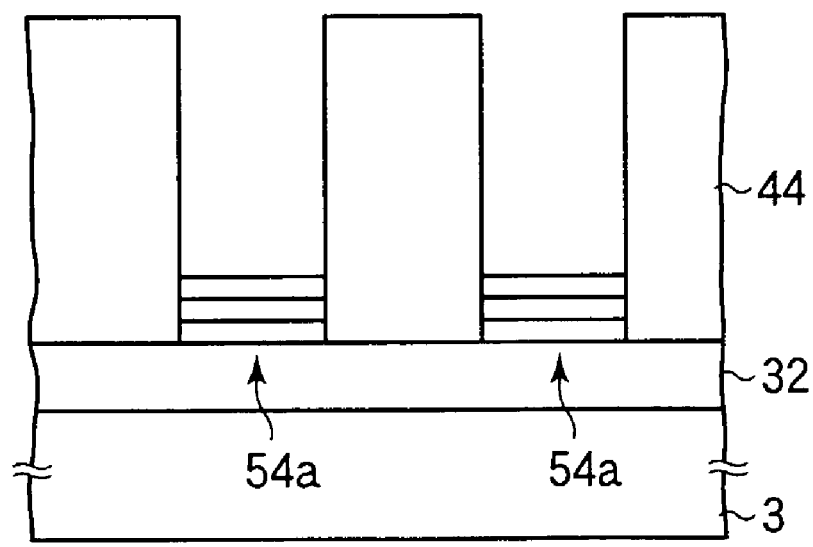
FIG. 43 is a manufacturing process sectional view (No. 5) of the electrode coupling region 54c of the drain terminal 54 taken along line F—F of FIG. 9 in the substrate for use in the liquid crystal display according to the first embodiment of the present invention.

Similarly, as shown in FIG. 43, the OC layer 44 of the drain terminal formation region 53 is opened at the electrode coupling region 54c, and the surface of the first terminal electrode 54a is exposed.

Besides, between the adjacent drain terminals 54, an end face of the OC layer 44 is formed to be almost coincident with an end face of the first terminal electrode 54a on the side of the electrode coupling region 54c. Further, a protrusion 60 is formed which protrudes from substantially the center portion of the end face of the OC layer 44 and in which a sectional shape parallel to the substrate surface of the glass substrate 3 is formed into, for example, a triangular shape having a vertical angle of an acute angle.

The protrusion 60 effectively functions in such a case that in an etching process using the OC layer 44 as a mask, as in a portion between the gate terminals 52 or the drain terminals 54, a residual substance in patterning of the second terminal electrodes 52b and 54b as the upper wiring lines causes a short-circuit defect. In addition to the case where the OC layer 44 is made as a mask, in an etching process using a resist pattern of either one of positive/negative resists as a mask, since the shape of a stepped portion at a position is moderated by the shape effect of the protrusion 60 as the position approaches the tip portion, the protrusion 60 has an effect to suppress the generation of the residual substance in the upper wiring line.

Further, the OC layer 44 on the frame region 56 is peeled and removed by patterning of the OC layer 44, and the OC layer 44 does not exist in the frame region 56 (see FIG. 50). With respect to the frame region 56 of the outer peripheral portion of the display region, it has been clarified from experimental results that since light from the backlight unit 22 is high, it is necessary to provide light shielding of at least two colors by laminating the resin CF layers 42. Thus, there arises a problem that when the resin CF layer 42 of the laminate structure is formed in the frame region 56 and the OC layer 44 is further laminated, the height of the display region 50 becomes different from that of the frame region 56, and the cell thickness of the liquid crystal is influenced.

Accordingly, in order to make the height of the display region 50 basically having one layer of the resin CF layer 42 equal to that of the frame region having two or more layers, with respect to the resin CF layer 42+the OC layer 44 of the display region 50, it is appropriate that the frame region 56 is made to have the two-layer structure of the resin CF layers 42 or the structure a little as high as that.

Moreover, in the patterning of the OC layer 44, while alignment is made with respect to the contact hole 46 formed in the resin CF layer 42 over the source electrode 30 of the TFT 2, a contact hole 46 is formed in the OC layer 44 as well (see FIG. 17). Similarly, while alignment is made with respect to the contact hole 48 formed in the resin CF layer 42 over the storage capacitance electrode 38, a contact hole 48 is formed in the OC layer 44 as well (see FIG. 24).

Subsequently, the insulating film 32 of the lower layer is removed by a dry etching using a fluorine-based gas while the OC layer 44 is used as a mask. The insulating film 32 of the formation region (including the electrode coupling region 52c) of the second terminal electrode 52b of the gate terminal 52 shown in FIG. 5 and that of the formation region of the second terminal electrode 54b of the drain terminal 54 are removed by this etching.

At the time of the etching of this insulating film 32, since the frame region 56 is exposed to the etching process, a reduction in film occurs. In the case where the resin CF layer 42 is used, a decrease of film thickness of one layer occurs in any color. By this, the frame region in which three layers of the resin CF layers are laminated is decreased to substantially the thickness of two-layer lamination of the resin CF layers (see FIG. 50).

Since Ti (or Mo) constituting the metal layer 62 of the source electrode 30 and the storage capacitance electrode 38 under the contact holes 46 and 48 has low resistance to a fluorine-based gas, Al is partially exposed, mainly from the side of the center portion. However, since Ti (or Mo) remains at the peripheral portion, there is no problem in the subsequent connection with the pixel electrode 10. Similarly, since Ti (or Mo) of the metal layer of the first terminal electrode 52b of the electrode coupling region 52b of the gate terminal formation region 51 and that of the first terminal electrode 54b of the electrode coupling region 54b of the drain terminal formation region 54 also has low resistance to the fluorine-based gas, Al is partially exposed, mainly from the side of the center portion. However, since Ti (or Mo) remains at the peripheral portion, there does not arise a problem in the subsequent connection with the second terminal electrodes 52b and 54b.

When the above etching process is ended, a heat treatment is carried out within the range of 200 to 230° C.

Figure 18:
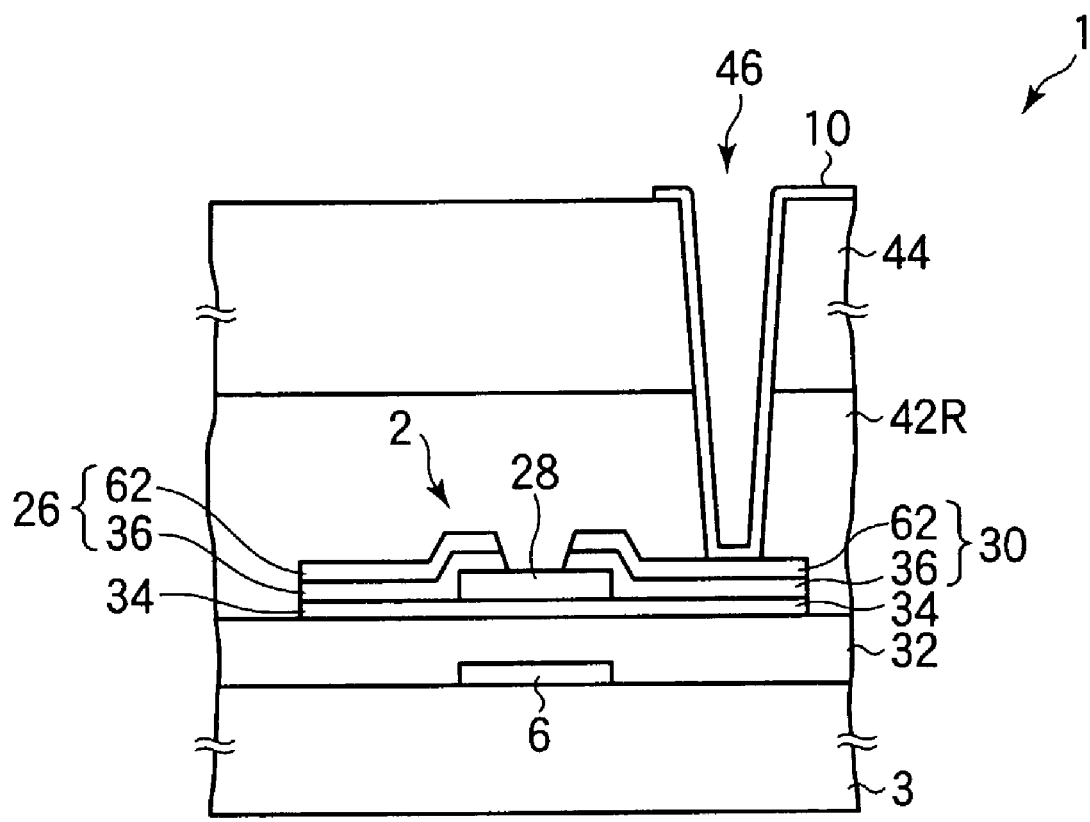
FIG. 18 is a manufacturing process sectional view (No. 7) of the TFT formation region taken along line A—A of FIG. 3 in the substrate for use in the liquid crystal display according to the first embodiment of the present invention.
Figure 19:
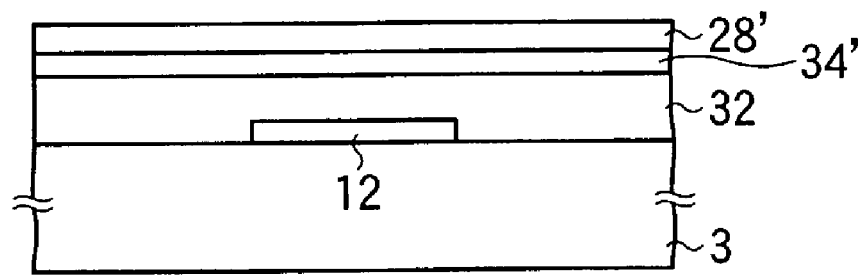
FIG. 19 is a manufacturing process sectional view (No. 1) of a storage capacitance formation region taken along line B—B of FIG. 3 in the substrate for use in the liquid crystal display according to the first embodiment of the present invention, which is a region extending through a contact hole 48.
Figure 20:
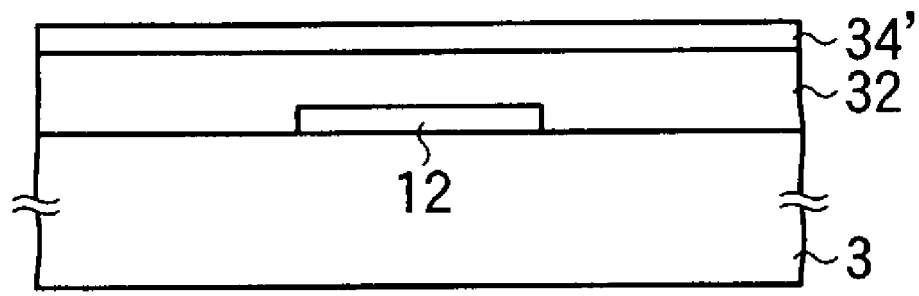
FIG. 20 is a manufacturing process sectional view (No. 2) of the storage capacitance formation region taken along line B—B of FIG. 3 in the substrate for use in the liquid crystal display according to the first embodiment of the present invention, which is the region extending through the contact hole 48.
Figure 21:
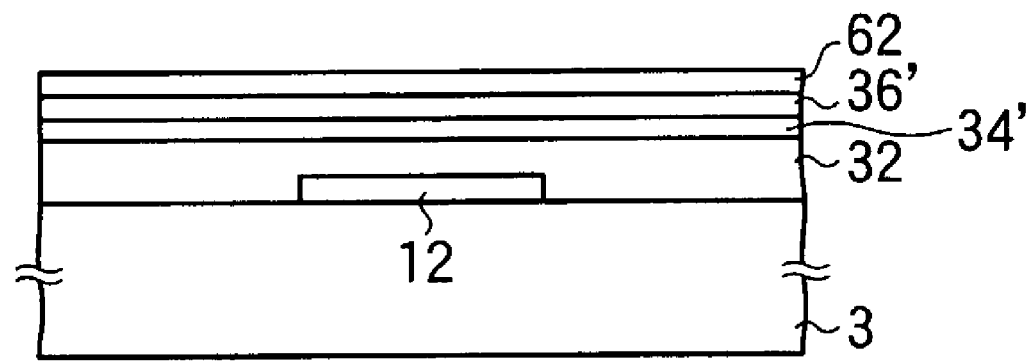
FIG. 21 is a manufacturing process sectional view (No. 3) of the storage capacitance formation region taken along line B—B of FIG. 3 in the substrate for use in the liquid crystal display according to the first embodiment of the present invention, which is the region extending through the contact hole 48.
Figure 25:
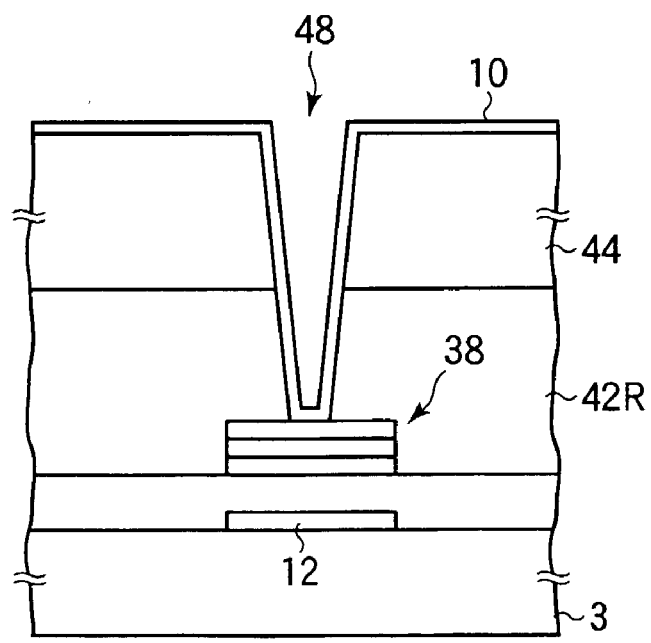
FIG. 25 is a manufacturing process sectional view (No. 7) of the storage capacitance formation region taken along line B—B of FIG. 3 in the substrate for use in the liquid crystal display according to the first embodiment of the present invention, which is the region extending through the contact hole 48.
Figure 26:
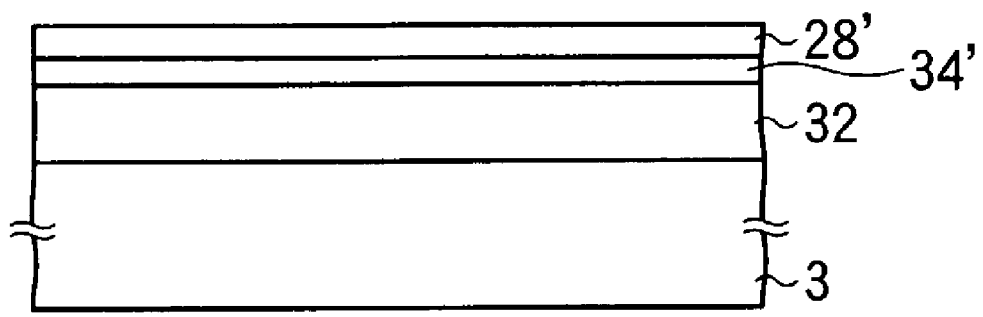
FIG. 26 is a manufacturing process sectional view (No. 1) of a region of a second terminal electrode 52b of a gate terminal 52 taken along line C—C of FIG. 6 in the substrate for use in the liquid crystal display according to the first embodiment of the present invention.
Figure 27:
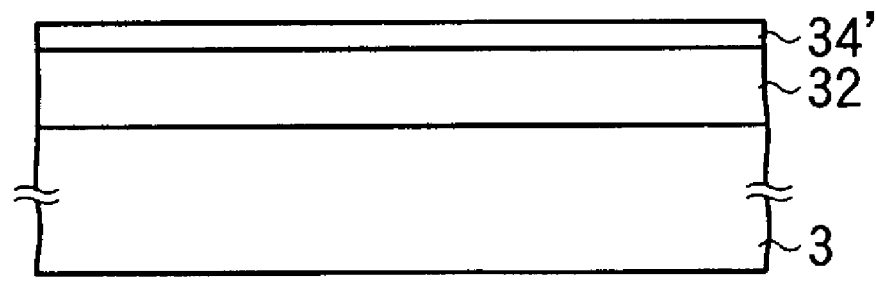
FIG. 27 is a manufacturing process sectional view (No. 2) of the region of the second terminal electrode 52b of the gate terminal 52 taken along line C—C of FIG. 6 in the substrate for use in the liquid crystal display according to the first embodiment of the present invention.
Figure 28:
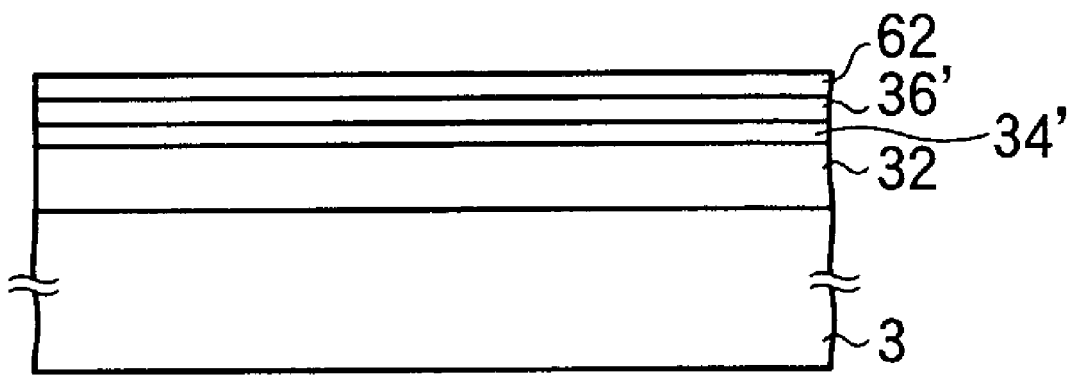
FIG. 28 is a manufacturing process sectional view (No. 3) of the region of the second terminal electrode 52b of the gate terminal 52 taken along line C—C of FIG. 6 in the substrate for use in the liquid crystal display according to the first embodiment of the present invention.
Figure 29:
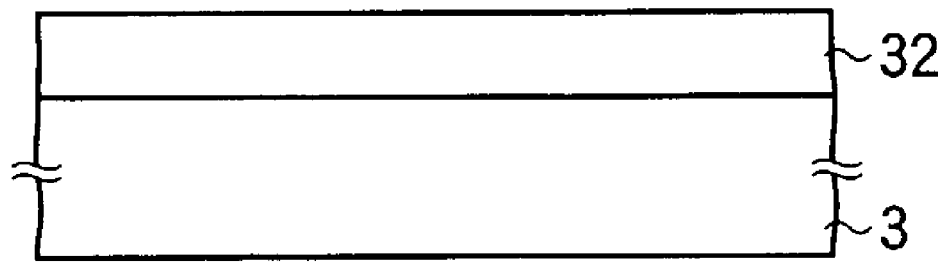
FIG. 29 is a manufacturing process sectional view (No. 4) of the region of the second terminal electrode 52b of the gate terminal 52 taken along line C—C of FIG. 6 in the substrate for use in the liquid crystal display according to the first embodiment of the present invention.
Figure 30:
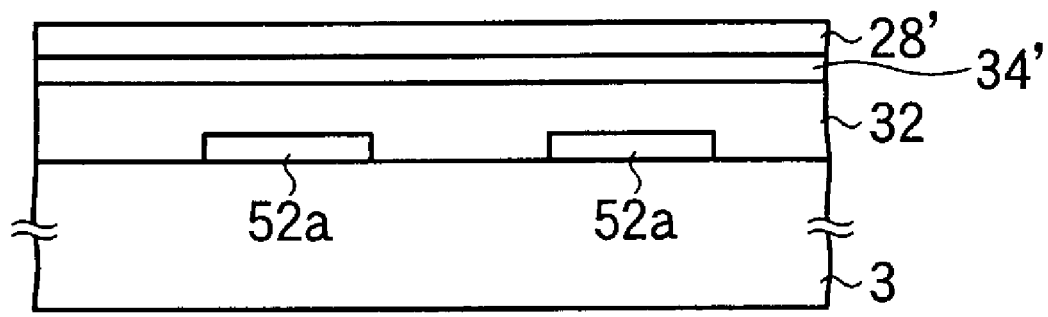
FIG. 30 is a manufacturing process sectional view (No. 1) of an electrode coupling region 52c of the gate terminal 52 taken along line D—D of FIG. 6 in the substrate for use in the liquid crystal display according to the first embodiment of the present invention.
Figure 31:
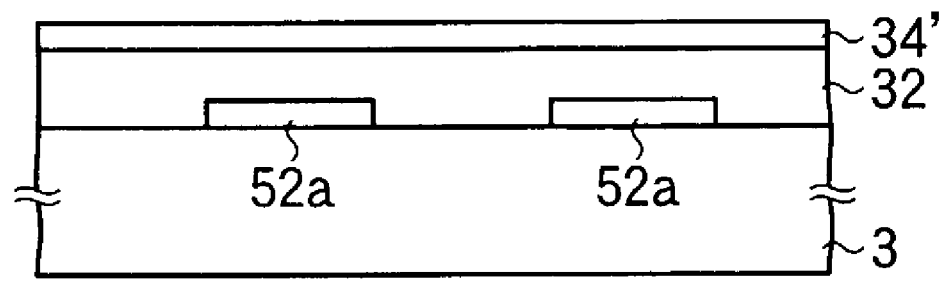
FIG. 31 is a manufacturing process sectional view (No. 2) of the electrode coupling region 52c of the gate terminal 52 taken along line D—D of FIG. 6 in the substrate for use in the liquid crystal display according to the first embodiment of the present invention.
Figure 32:
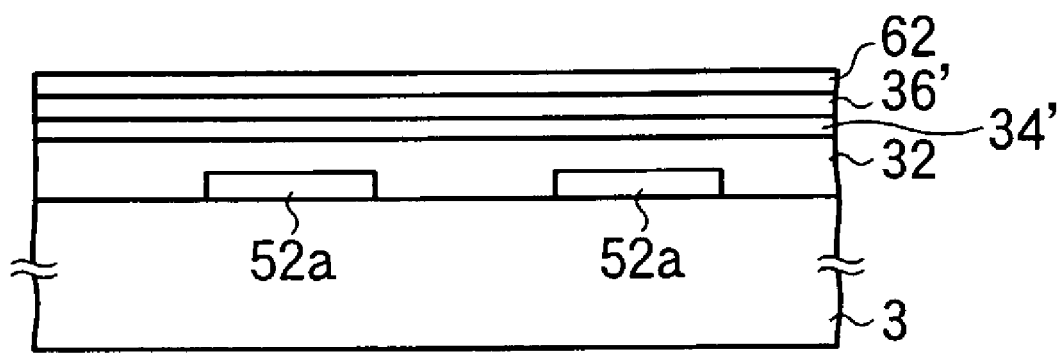
FIG. 32 is a manufacturing process sectional view (No. 3) of the electrode coupling region 52c of the gate terminal 52 taken along line D—D of FIG. 6 in the substrate for use in the liquid crystal display according to the first embodiment of the present invention.
Figure 33:
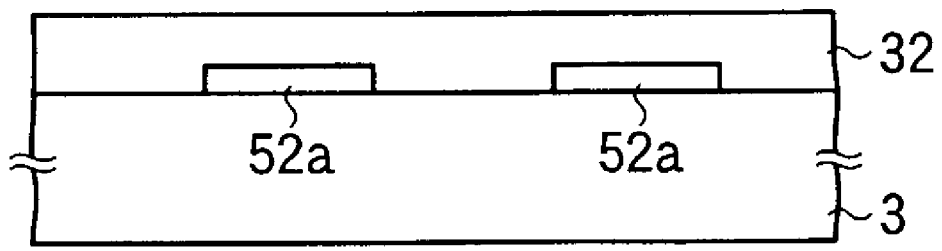
FIG. 33 is a manufacturing process sectional view (No. 4) of the electrode coupling region 52c of the gate terminal 52 taken along line D—D of FIG. 6 in the substrate for use in the liquid crystal display according to the first embodiment of the present invention.

Subsequently, after an ITO film (thickness of 70 nm) for formation of the pixel electrode 10 made of ITO (Indium Tin Oxide) as a transparent oxide conductive material is formed on the whole surface of the substrate by a thin film formation method such as sputtering, a resist mask of a predetermined pattern is formed, and the pixel electrode 10 electrically connected to the source electrode 30 and the storage capacitance electrode 48 through the contact holes 46 and 48 is formed by a wet etching using an oxalic etchant (see FIGS. 18 and 25). At the same time, as shown in FIGS. 5 and 8, the second terminal electrode 52b connected to the first terminal electrode 52a through the electrode coupling region 52c is patterned in the gate terminal formation region 51, and as shown in FIGS. 5 and 11, the second terminal electrode 54b connected to the first terminal electrode 54a through the electrode coupling region 54c is patterned in the drain terminal formation region 54. Thereafter, a heat treatment is carried out within the range of 150 to 230° C., preferably 200° C.

Further, at the same time, as shown in FIG. 50, the protection film 70 is patterned to cover the resin CF layer 42 which exposes in a region where the OC layer 44 of the frame region 56 is not formed.

Figure 45:
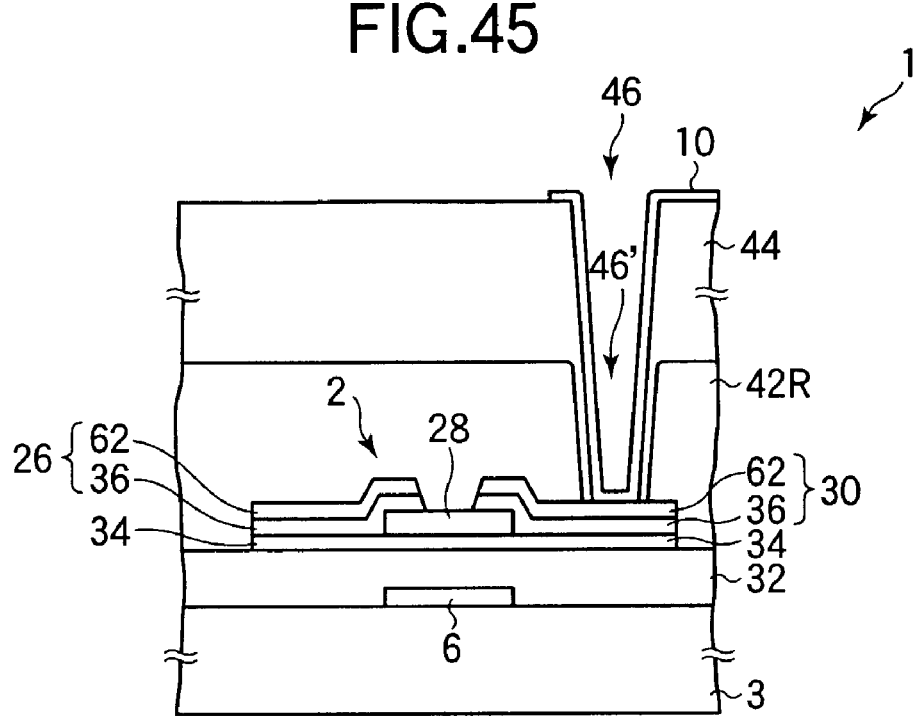
FIG. 45 is a view showing a modified example of the vicinity of a contact hole 46 in the substrate for use in the liquid crystal display according to the first embodiment of the present invention.

FIG. 45 shows a modified example of the vicinity of the contact hole 46. As shown in FIG. 45, after the resin CF layer 42 is formed, a rather wide contact hole 46' is formed in the resin CF layer 42. When the OC layer 44 is formed and the contact hole 46 is opened, the OC layer 44 is made to remain on the inner wall of the contact hole 46'. By doing so, the resin CF layer 42 can be covered with the OC layer 44 on the inner wall of the contact hole 46 as well.

Besides, in this embodiment, it is important that the distance in the direction of the substrate surface from the edge of the contact hole 46 to the gate bus line 6, indicated by width α in FIG. 3, is 6 μm or more in the case where the size of the pixel region is approximately 300 μm by 100 μm.

As stated above, when the OC layer 44 is made to remain on the inner wall of the contact hole 46, and the width is made 6 μm or more, in the process, a possibility that a crack (fissure) or the like due to stress by difference in thermal expansion coefficient is produced in the contact hole 46, can be suppressed to a very low level.

In the case where the pixel electrode 10 is disposed on the OC layer 44, a crack defect is apt to occur by the difference in thermal expansion coefficient as described above, and it distinctively occurs not in a flat portion, but in the vicinity of a portion having a stepped portion such as a contact hole. Accordingly, the relation between the OC layer 44 and the contact hole is important, and the defect can be improved by adjusting the relation of the distance and area of the flat portion of the pixel region with respect to the film thickness and hole diameter of the resin layer forming the contact hole and the taper length of the contact hole. Preferably, the distance of the end portion of the pixel is made 2.5 or more times as large as the film thickness of the OC layer 44, the distance of the taper portion at the contact hole end is made 1.5 or more times as large as the film thickness, or the angle is made 45° or less.

Besides, as shown in FIG. 3, the pixel electrode 10 of the pixel region according to this embodiment has such a structure that except for the source electrode 30 of the TFT 2 and the storage capacitance electrode 38, when viewed in the direction of a normal of a substrate surface, the pixel electrode does not overlap with the lower electrode wiring line such as the gate bus line 6 or the drain bus line 8. Thus, the occurrence of cross talk can be sufficiently suppressed, and excellent display quality can be obtained.

From the above, the substrate for use in the liquid crystal display (TFT substrate 1) according to this embodiment is completed. Thereafter, through a panel unit process, the liquid crystal display shown in FIG. 1 is completed. In order to cause the light shielding function of this embodiment to be more effectively fulfilled, it is preferable to adopt a normally-black (NB) mode, and more preferably, it is preferable to use a vertical alignment negative liquid crystal typified by the MVA.

According to this embodiment using the above construction and the manufacturing method, with respect to the external connection terminal, since the second terminal electrodes 52b and 54b made of oxide conductive material are directly formed on the glass substrate 3 with excellent adhesion, a short-circuit defect between the adjacent terminals due to peeling of a terminal or the like can be prevented.

Besides, according to the light shielding structure of this embodiment, since at least the green resin CF layer can be formed on all the TFTs 2 of the pixel region, the light shielding film of sufficient light shielding capability can be formed. Further, since the resin CF layer 42 of two-layer structure can be formed in the frame region 56, sufficient light shielding to light leakage from the backlight unit becomes possible. On the other hand, since the pixel region P can be made to have the laminate structure of the resin CF layer 42 of one layer and the OC layer 44, if the film thickness of the resin CF layer 42 of the two-layer structure is made substantially equal to the film thickness of the laminate structure of the resin CF layer 42 of one layer and the OC layer 44, it is possible to realize the substrate for use in the liquid crystal display, in which the uniform cell gap can be obtained.

Further, in the panel unit process, when the pre-tilt angle is provided to liquid crystal molecules by using polymer, monomer in the liquid crystal is polymerized by irradiating UV light to the liquid crystal while a predetermined voltage is applied between the common electrode on the opposite substrate 4 and the pixel electrode 10 on the TFT substrate 1 after sealing the liquid crystal. Thereby, a predetermined pre-tilt angle is provided to liquid crystal molecules. At this time, if a voltage is applied also on the frame region 56, a pre-tilt angle is provided to liquid crystal molecules on the frame region 56 by polymerization, therefore a light shielding performance by the liquid crystal layer decreases in NB mode. To suppress this, non-voltage applied state is produced to the liquid crystal on the frame region 56 by connecting the conductive protection film 70 on the frame region 56 to the common electrode.

The voltage applied to the storage capacitance bus line 12 when this pre-tilt angel is provided is different from the common voltage, therefore it is important that the protection film 70 on the frame region 56 is electrically separated from the storage capacitance bus line 12 or connected in high resistance.

Next, a substrate for use in a liquid crystal display according to a second embodiment of the present invention, a method of manufacturing the same, and a liquid crystal display using the same will be described with reference to FIGS. 46 to 48, FIG. 51 and FIG. 52. In this embodiment, a description will be given of a case where an SiN film 40 as an interlayer insulating film is formed between a TFT 2 and a resin CF layer 42. Incidentally, structural elements having the same function and operation as those of the first embodiment are designated by the same characters, and the description is omitted.

First, an original of the TFT 2 is completed through the same process as that of FIGS. 12 to 15 showing the manufacturing process of the TFT 2 in the method of manufacturing the substrate for use in the liquid crystal display according to the first embodiment. Next, as a protection film, the SiN film 40 of an inorganic insulating film is formed to a thickness of 10 to 150 nm, preferably, about 50 nm by a plasma CVD method.

Preferable film formation conditions of the SiN film 40 and film quality conditions are as follows:

film formation temperature: gate insulating film (SiN film) 32>270° C.$\geq$SiN film 40;

refractive index (R.I.): when the refractive index of the gate insulating film (SiN film) 32 is 1.82 to 1.92, the refractive index of the SiN film 40 exceeds 1.92; and etching rate (E.R.): (SiN film 40)/(gate insulating film (SiN film) 32)$\geq$0.7.

Figure 46:
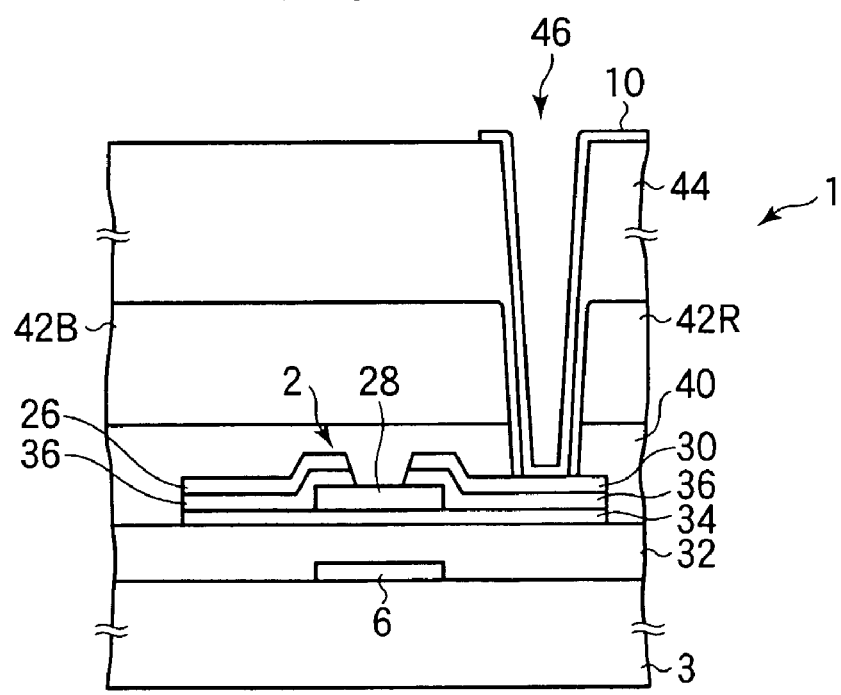
FIG. 46 is a view showing a dimensional relation between an OC layer 44, a resin CF layer 42, and an SiN film 40 at a contact hole 46 in a substrate for use in a liquid crystal display according to a second embodiment of the present invention and corresponding to FIG. 1 of the first embodiment.

Next, although the procedure proceeds to a formation process of color resin, since it is the same as the first embodiment, the description is omitted. Subsequently, although an OC layer 44 is formed, since it is the same as the first embodiment, the description is omitted. The dimensional relation of the OC layer 44, the resin CF layer 42, and the SiN film 40 in a contact hole 46 is as shown in FIG. 46. That is, the relation of the resin CF layer 42>the SiN film 40>the OC layer 44 is satisfied, and the resin CF layer 42 is covered with the OC layer 44. By doing so, it becomes possible to prevent the influence of pollution of the color resin.

Figure 47:
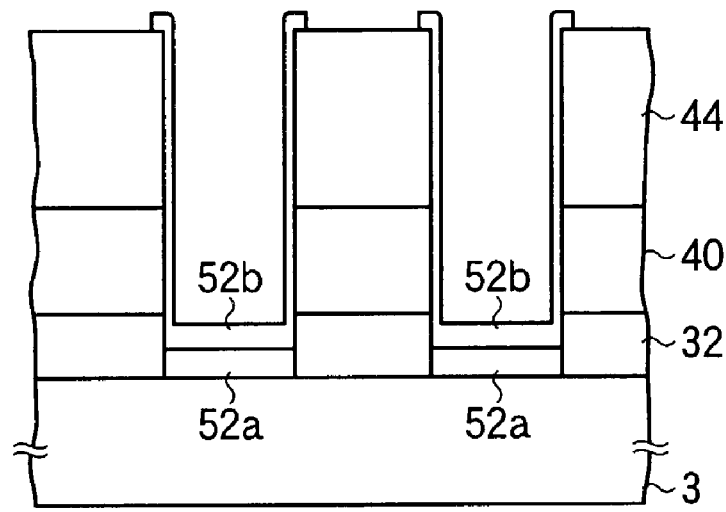
FIG. 47 is a view showing that an SiN film 40 is formed as an interlayer insulating film in the substrate for use in the liquid crystal display according to the second embodiment of the present invention and corresponding to FIG. 8 of the first embodiment.
Figure 48:
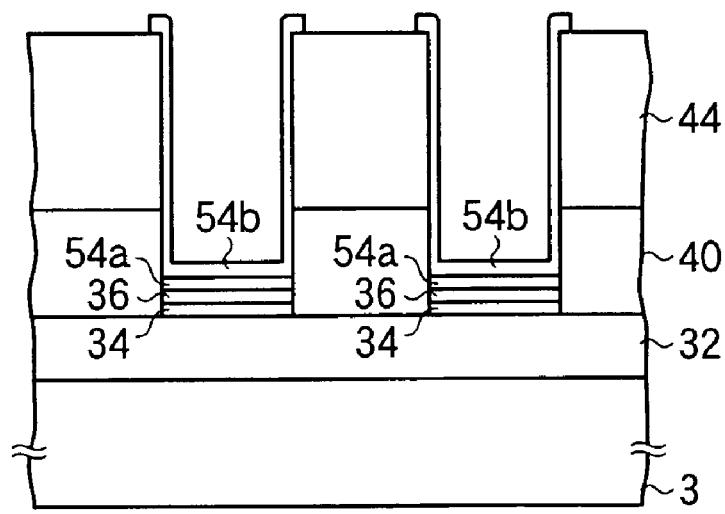
FIG. 48 is a view showing that the SiN film 40 is formed as the interlayer insulating film in the substrate for use in the liquid crystal display according to the second embodiment of the present invention and corresponding to FIG. 11 of the first embodiment.

The characteristic construction of the substrate for use in the liquid crystal display according to this embodiment is shown in FIGS. 46 to 48. FIGS. 46 to 48 respectively correspond to FIGS. 1, 8 and 11 in the first embodiment. As shown in FIGS. 46 to 48, the SiN film 40 is formed as the interlayer insulating film between the TFT 2 and the resin CF layer 42, for preventing the pollution due to the color resin.

The substrate for use in the liquid crystal display according to this embodiment also has the same effect as the first embodiment. Further, since the pollution due to the color resin can be prevented by disposing an interlayer protection film on the TFT 2, the degree of freedom concerning the selection of the color resin can be improved. Further, the invention can be preferably applied to not only the TFT substrate of the channel protection type (ISI) TFT structure according to the first and the second embodiments, but also to a TFT substrate of an etch back type (NSI) TFT structure which is more apt to receive the influence of pollution. Besides, also with respect to the liquid crystal layer, since the construction is such that the OC layer 44 covers the color resin, it is possible to prevent the pollution to the liquid crystal.

Figure 51:
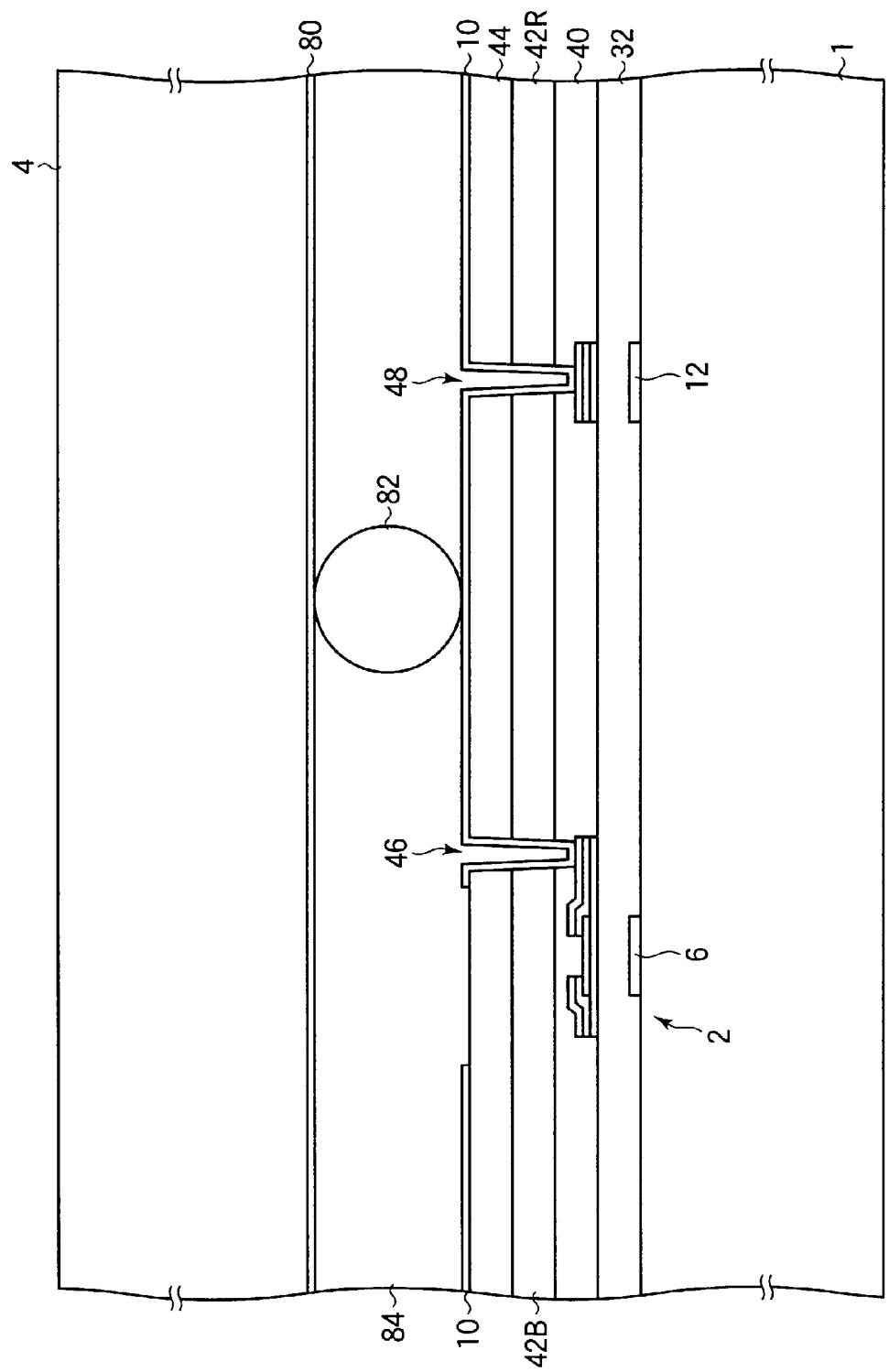
FIG. 51 is a sectional view showing a state where the liquid crystal is sealed by bonding the liquid crystal display substrate and the opposite substrate according to the second embodiment of this invention.
Figure 52:
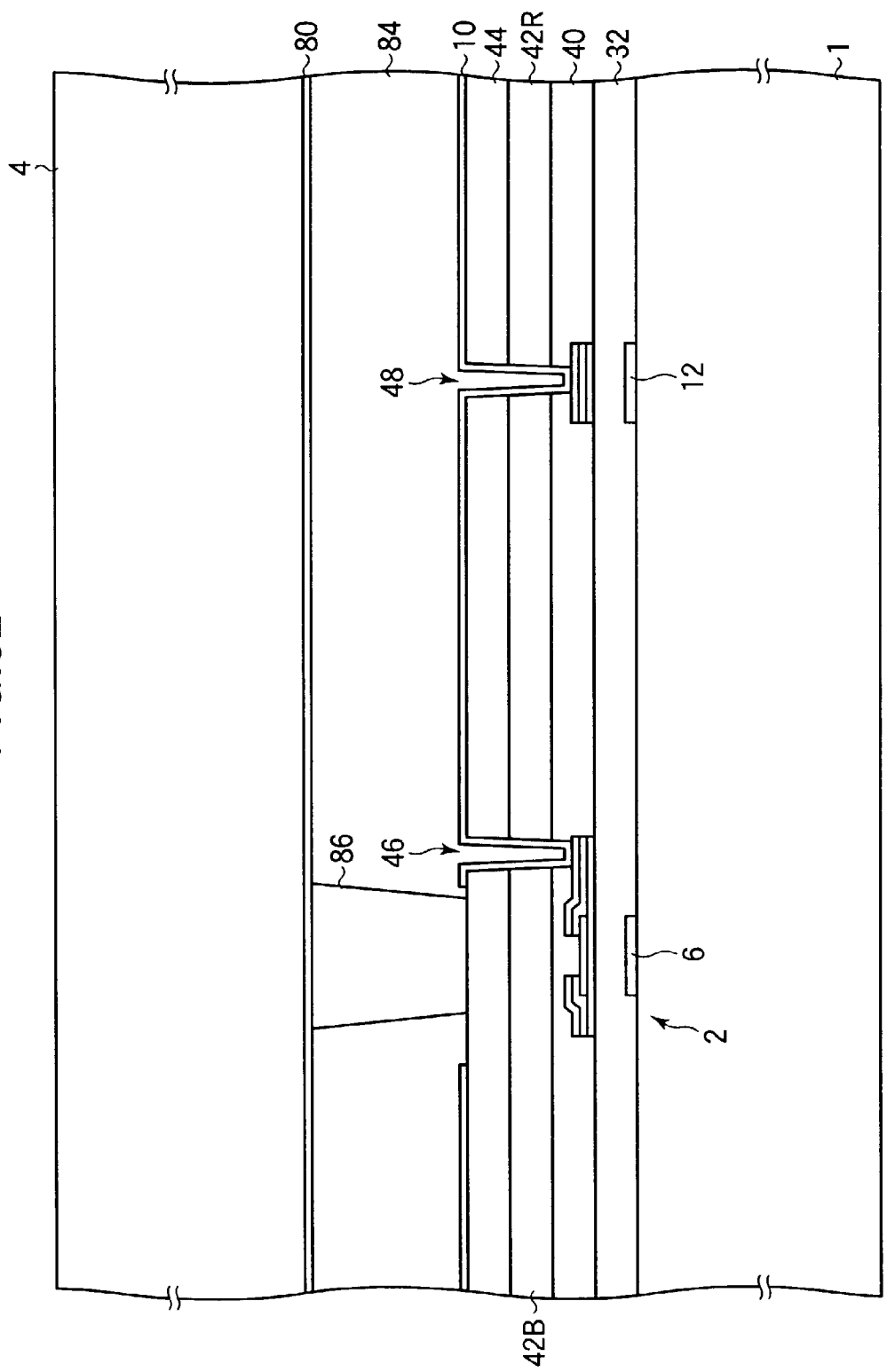
FIG. 52 is a sectional view showing another example of a state where the liquid crystal is sealed by bonding the liquid crystal display substrate and the opposite substrate according to the second embodiment of this invention.

FIG. 51 is a state where liquid crystal 84 is sealed by attaching the TFT substrate 1 and the opposite substrate 4 according to this embodiment and it shows a section taken along a line through liens A—A and B—B in FIG. 3. As shown in FIG. 51, when the TFT substrate 1 of the CF-on-TFT structure according to this embodiment is used, only a common electrode 80 and an orientation film (not shown) are required to be formed on the glass substrate of the opposite substrate 4. A cell gap is obtained by a globular spacer (bead) 82 made of glass or resin. FIG. 52 shows a LCD in which a photolithography process is used for forming a columnar spacer 86 instead of the globular spacer 82 and thereby a predetermined cell gap is obtained by the columnar spacer 86. In FIG. 52, although the columnar spacer 86 is formed on the side of the opposite substrate 4, it can be, of course, formed on the side of the TFT substrate 1. Also, the structure showed in FIG. 51 and FIG. 52 can be, of course, applied to the first embodiment and to a third embodiment to be explained next.

Next, a substrate for use in a liquid crystal display according to a third embodiment of the present invention, a method of manufacturing the same, and a liquid crystal display using the same will be described with reference to FIG. 49. The substrate for use in the liquid crystal display according to this embodiment has a feature that as shown in FIG. 49, a vernier pattern for confirmation of a position shift is added to the TFT substrate 1 described in the first and the second embodiments.

Figure 49:
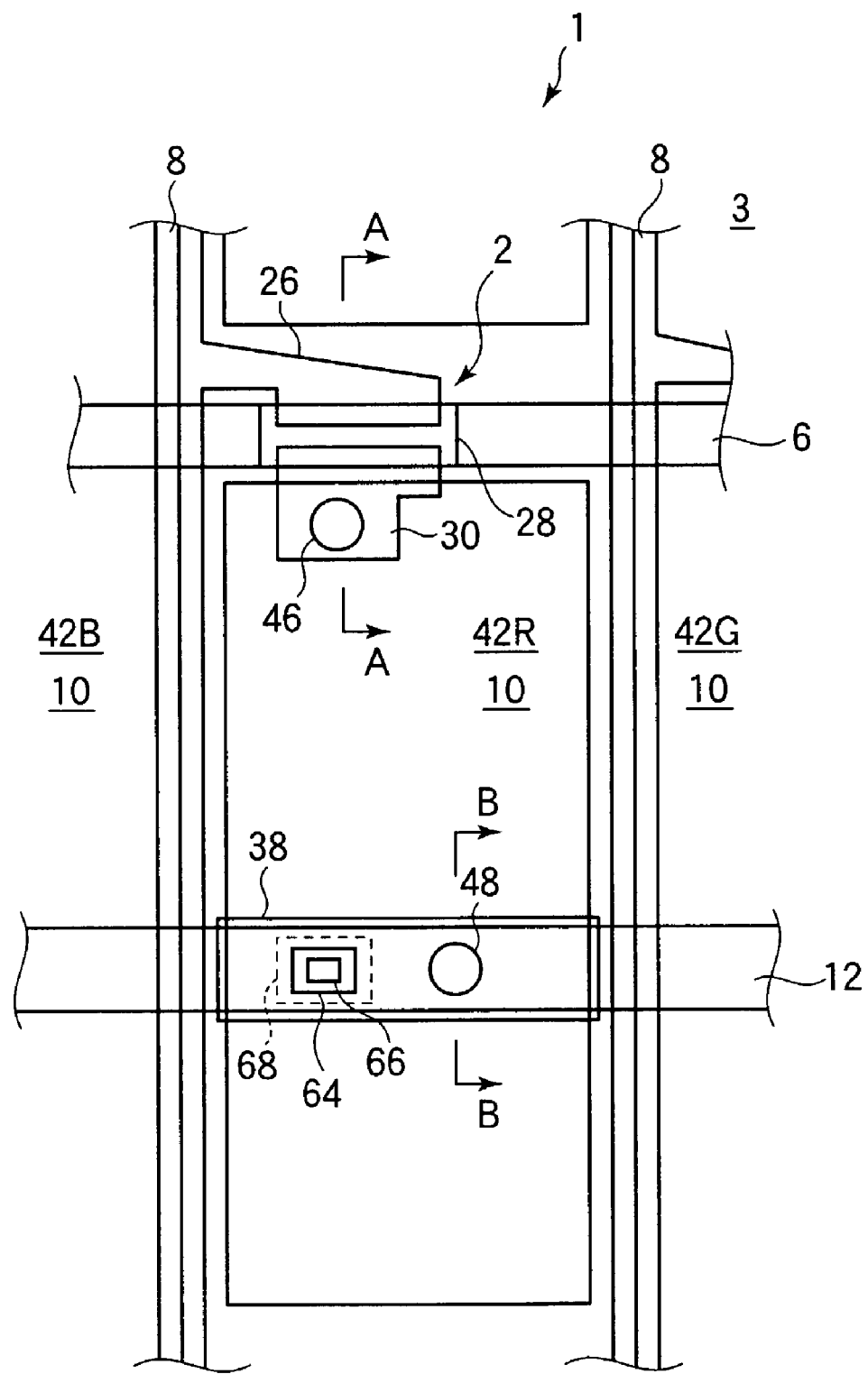
FIG. 49 is a view showing a substrate for use in a liquid crystal display according to a third embodiment of the present invention.

As shown in FIG. 49, the vernier pattern for confirmation of the position shift includes a rectangular first opening pattern 64 formed by opening the storage capacitance electrode 38, a rectangular second opening pattern 66 formed by opening the pixel electrode 10 and having such a size that it is contained in the first opening pattern, and a rectangular third opening pattern 68 formed by opening the resin CF layer 42 and having such a size that it contains the first and the second opening patterns 64 and 66.

By doing so, it is possible to eliminate an automatic focusing error of a dimension measurement device provided with an incident-light optical system, and incident-light absorption in the resin CF layer 42, and it becomes possible to easily and accurately make a superposition measurement of the pixel electrode 10 and the lower layer metal pattern. Besides, if the OC layer 44 and the contact hole 46 are separately formed, the OC layer 44 on the vernier pattern for confirmation of the position shift can also be removed, and a focus shift of an inspection device can be improved.

The present invention is not limited to the above embodiments, but can be variously modified.

For example, in addition to the illustrations of the embodiments, the present invention is naturally applicable even if the kind and structure of wiring metal, the film thickness and formation method, or the etching method varies.

Besides, in the above embodiments, although the TFT 2 is of the ISI type, the present invention is not limited to this, but naturally, the invention can also be applied to an NSI, a positive stagger type, a coplanar type or the like. Further, the present invention can be naturally applicable even when a semiconductor forming a channel of the TFT is made poly-silicon (P-Si) instead of a-Si. Besides, even if the structure of the insulating film varies or the insulating substrate is a plastic substrate instead of the glass substrate, the present invention is naturally applicable.

Besides, according to the above embodiments, although the description has been given of the example of the pixel structure of the so-called independent CS system in which the storage capacitance (CS) bus line 12 intersects the center of the pixel, the invention is not limited to this, but the invention can be naturally applied to a pixel structure of the so-called CS on gate system using a next stage gate bus line as a storage capacitance bus line, instead of the independent CS system.

As described above, according to the present invention, even in the construction in which a novel resin is not used for the CF layer or the OC layer, the wiring layer and the pixel region end portion are not overlapped with each other, and a special light shielding pattern is not included, the liquid crystal display which is excellent in display characteristics and has high reliability and high performance can be realized.

Besides, according to the present invention, since the resin CF layer is provided and the light shielding function is also provided on the side of the array substrate, the manufacturing process of the liquid crystal display can be simplified on the whole, and further, even if bonding accuracy to the opposite substrate is rather low, a panel having a high opening ratio and high definition can be mass-produced.

Further, according to this invention, a full light shielding function can be obtained in the frame region without forming a remarkable stepped portion between the frame region and the display region. Furthermore, since the resin CF forming the light shielding layer can be made not to contact directly to the liquid crystal layer, pollution to the liquid crystal can be prevented.

Further, according to this invention, the liquid crystal layer on the frame region can be efficiently utilized as a light shielding layer.

What is claimed is:

1. A substrate for use in a liquid crystal display comprising:
    an insulating substrate cooperating with an oppositely arranged opposite substrate to hold a liquid crystal;
    a pixel electrode formed in each of a plurality of pixel regions arranged in a matrix form on the insulating substrate;
    a switching element connected to the pixel electrode and a bus line;
    an external connection terminal for electrically connecting an external circuit and the bus line, the external connection terminal including a first terminal electrode electrically connected to the bus line, a second terminal electrode formed of a forming material of the pixel electrode and on the insulating substrate, and an electrode coupling region for electrically connecting the first and the second terminal electrodes; and
    an overcoat layer formed between the switching element and the pixel electrode and made of an insulating resin material,
    wherein the overcoat layer is not formed at least between the second terminal electrode and the insulating substrate.

2. A substrate for use in a liquid crystal display according to claim 1, wherein the overcoat layer includes a protrusion in the vicinity of the electrode coupling region.

3. A liquid crystal display comprising a pair of substrates and a liquid crystal sealed between the pair of substrates,
    wherein one of the substrates is a substrate for use in a liquid crystal display according to claim 1.

4. A liquid crystal display according to claim 3, wherein the liquid crystal includes polymer providing a pre-tilt angle to liquid crystal molecules.

* * * * *

UNITED STATES PATENT AND TRADEMARK OFFICE
CERTIFICATE OF CORRECTION

PATENT NO. : 7,050,137 B2  Page 1 of 1
APPLICATION NO. : 10/259977
DATED : May 23, 2006
INVENTOR(S) : Hoshino et al.

It is certified that error appears in the above-identified patent and that said Letters Patent is hereby corrected as shown below:

On the Patent Face:

Under (75) Inventors, delete the following inventors:

"Atuyuki HOSHINO
Akira KOMORITA
Manabu SAWASAKI
Takashi TAKAGI
Takuya SAGUCHI
Shiro HIROTA
Katsunori MISAKA
Akihiro MATSUI
Masahiro IKEDA
Tomonori TANOSE
Hiroyasu INOUE
Hidetoshi SUKENORI"

At the Top of Title Page delete "Hoshino" and insert therefor -- Kondo --.

Signed and Sealed this

Fourth Day of September, 2007

JON W. DUDAS
*Director of the United States Patent and Trademark Office*